United States Patent
Fujii et al.

[11] Patent Number: 6,166,823
[45] Date of Patent: Dec. 26, 2000

[54] PRINTING METHOD AND APPARATUS, PAPER EJECTING POSITION CONTROL METHOD AND APPARATUS

[75] Inventors: Naoto Fujii; Hiroyo Teramoto, both of Hyogo, Japan

[73] Assignee: Fujitsu Limited, Kawasaki, Japan

[21] Appl. No.: 09/042,793

[22] Filed: Mar. 17, 1998

[30] Foreign Application Priority Data

Aug. 29, 1997 [JP] Japan ................................. 9-233562

[51] Int. Cl.[7] .............................. B41B 15/00; B41J 15/00; G06F 15/00; G03G 15/00
[52] U.S. Cl. ......................... 358/1.14; 358/1.12; 399/19
[58] Field of Search ................................... 358/1.5, 1.12, 358/1.14, 1.16, 1.17; 271/207, 314; 414/791.2, 792.5; 399/19

[56] References Cited

U.S. PATENT DOCUMENTS

| | | | |
|---|---|---|---|
| 4,989,853 | 2/1991 | Matysek et al. | 270/58 |
| 5,007,625 | 4/1991 | Kremers et al. | 270/53 |
| 5,618,035 | 4/1997 | Coombs et al. | 271/13 |
| 5,848,346 | 12/1998 | Takashiro | 399/404 |
| 5,887,991 | 3/1999 | Narita et al. | 400/70 |
| 5,913,015 | 6/1999 | Watanabe et al. | 395/111 |

*Primary Examiner*—Kimberly A. Williams
*Attorney, Agent, or Firm*—Armstrong, Westerman, Hattori, McLeland & Naughton

[57] ABSTRACT

A printing apparatus and a printing method for the printing apparatus, along with a paper ejecting position control method and apparatus of the printing apparatus are provided wherein a print control unit is provided with an instruction evacuating area and a paper ejection evacuating area both for storing information associated with the ejecting position. The ejecting position is contained in an instruction provided to a printing portion based on offset information and contents stored in the instruction evacuating area. The contents of the paper ejection evacuating area are updated based on ejecting position contained in the instruction provided to the printing portion. The paper ejection evacuating area is updated based on the actual ejecting position, and the contents of the instruction evacuating area are updated based on the contents of the paper ejection evacuating area in a recovery after printing failure occurred, therefore, paper can always be ejected to the proper position.

16 Claims, 25 Drawing Sheets

DP PRINT INFORMATION

DG PAGE DATA

FIG. 10

| DF REQUEST / AREA | "NO" | "YES" |
|---|---|---|
| 0 | NONE | X |
| X | (X) | Y |
| Y | (Y) | X |

124 points to the DF/AREA header cell. DFG indicates the data rows.

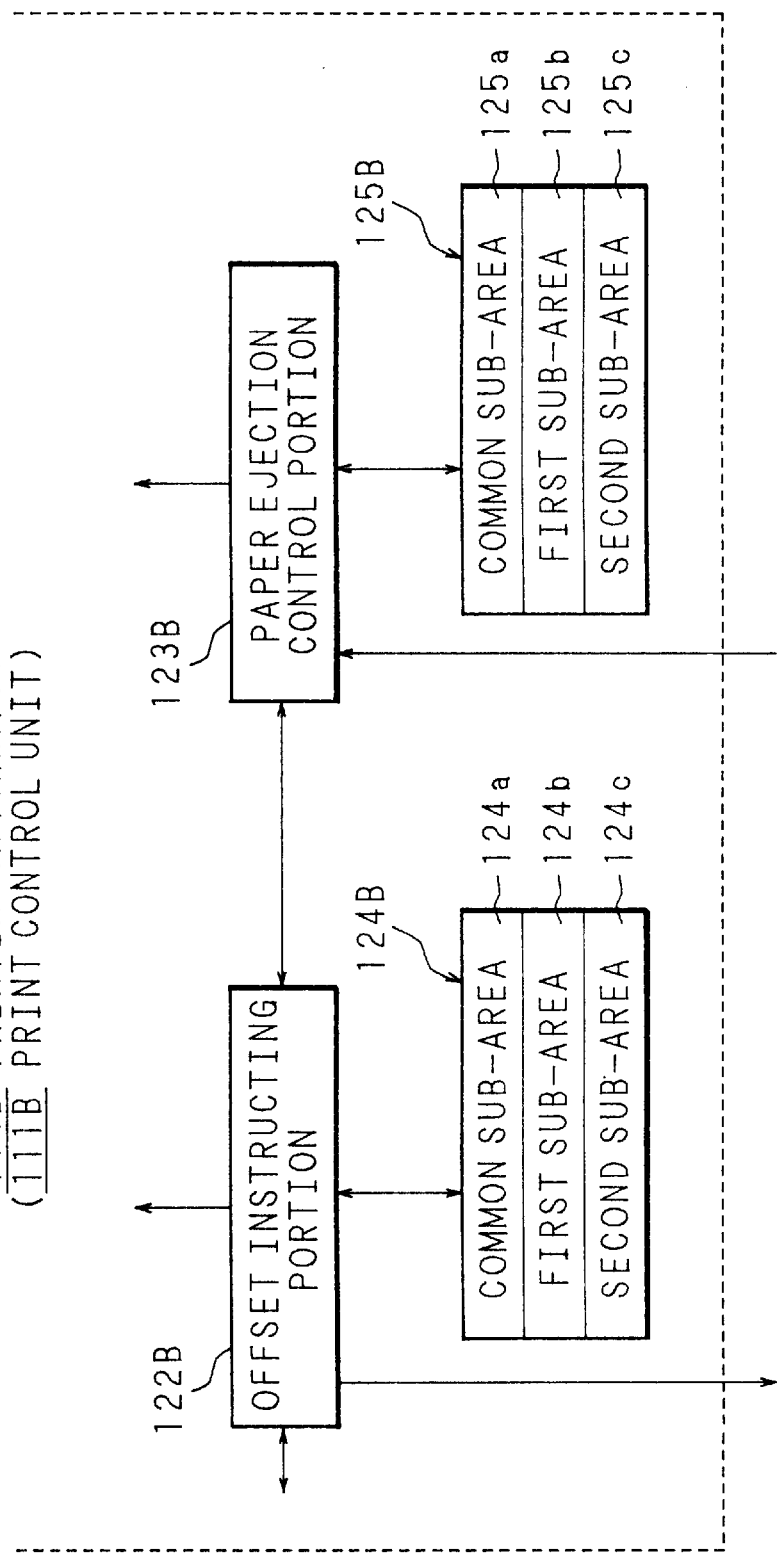

PRINTING METHOD AND APPARATUS, PAPER EJECTING POSITION CONTROL METHOD AND APPARATUS

BACKGROUND OF THE INVENTION

1. Field of the Invention

The present invention relates to a printing apparatus provided with a paper ejecting mechanism for ejecting a printed paper to mutually different paper ejecting positions and a printing method for the printing apparatus, and more particularly, to the paper ejecting position control method and apparatus of the printing apparatus as described above designed to carry out the paper ejecting position control so that the proper recovery can be performed at the time of the occurrence of a printing failure.

2. Description of the Related Art

With the development of the high performance printer apparatuses, there have frequently been practiced to print a plurality of different kinds of documents with a series of print information. In order to sort different kinds printed documents, a paper ejecting mechanism is used which is designed to give the so-called offset of the paper ejecting position by document to the paper ejected from the printer apparatus.

On the other hand, the requirements for an elevation of reliability of a computer system have become higher year by year, and high reliability is demanded for the printer apparatuses with respect to its printing results. For example, in case of a printing failure caused by stoppage of the printer apparatus due to paper jamming or paper shortage during the use of the printer apparatus, assured and easy practice of recovery (re-printing) is required so as not to cause excess or shortage to the printing results including the offset position.

With respect to the conventional paper ejecting position control method, description is made in reference to FIG. 1 and FIG. 2 which show the conventional printing system 1 and printing apparatus 4.

In FIG. 1, the printing apparatus 4 comprises a print control unit 11 and a printing portion 12. To the print control unit 11, print information DP is inputted where the print information DP is transmitted from an upper rank apparatus 3. The print information DP includes the printing information DT which is the printing contents and attribute information DA of the printing information DT. The attribute information DA includes offset information DF which is information to instruct the paper ejecting position. The printing portion 12 has a printing mechanism 31 for performing printing on paper according to the contents of the printing information DT and a paper ejecting mechanism 32 for ejecting the printed paper to the ejecting position instructed by the offset information DF.

The offset information DF is allocated in units of a page to be printed, and information to show whether or not each page should be placed in the different paper ejecting position from the preceding page, i.e., whether or not there is a request to give an offset (offset request). The print control unit 11, when it has received the information of "offset request yes", stores. the offset information DF in a paper information table 26 provided for the internal administration of the print control unit 11. When sending a request for printing of said page from the print control unit 11 to the printing portion 12, the print control unit 11 issues an instruction containig the offset position to the printing portion 12 immediately before the request for printing.

When issuing an instruction containig the offset position from the print control unit 11 to the printing portion 12, the offset position is determined on the bases of the offset information DF stored in the paper information table 26 and the contents of the instruction evacuating area 24. According to the determined offset position, i.e., the offset position for which the actual instruction has been issued, the contents of the instruction evacuating area 24 are updated.

Next, regarding the conventional offset position instructing condition and recovery condition when printing failure, a concrete description is made based on FIG. 3, FIG. 4, and FIG. 5.

FIG. 3 is a view showing the conventional state of the case of printing by the print information DP1 for five pages and ejecting the paper by offsetting on the fourth page; FIG. 4 is a view for illustrating the conventional condition of instructing the offset position; and FIG. 5 is a view for illustrating the conventional condition of the offset position in a recovery.

In FIG. 3A there are shown on the first page and the fourth page the conditions to which the information of "offset request yes" is attached. In FIG. 3B, there is shown the paper ejecting condition in the case where proper paper ejection is made based on the print information DP1.

In FIG. 4, since the first page is "offset request yes", prior to the request to print the first page, the offset position is contained in an instruction from the print control unit 11 to the printing portion 12. In the contents of the instruction evacuating area 24, the initial value is "0", so that based on this and "offset request yes", "X position" is determined as the offset position and instructed. Together with the instruction of "X position", the contents of the instruction evacuating area 24 are updated to "X position". In the printing portion 12, the "X position" is memorized as the paper ejecting position of the first page. Subsequently, each printing information DT of the first page, second page, and third page is sent from the print control unit 11 to the printing portion 12.

Because the fourth page is "offset request yes", prior to the request to print the fourth page, the offset position is contained in an instruction to the printing portion 12 from the print control unit 11. The contents of the instruction evacuating area 24 is "X position", and based on this and "offset request yes", "Y position" is determined as the offset position and instructed. Along with the instruction of "Y position", the contents of the instruction evacuating area 24 is updated to "Y position". In the printing portion 12, "Y position" is memorized as the paper ejecting position of the fourth page. Thereafter, each printing information DT of the fourth page and the fifth page is sent from the print control unit 11 to the printing portion 12.

Subsequently, or in parallel with it, printing is performed in the printing portion 12, and paper ejection is made in order of the first page, second page, and third page to the "X position". Offset is made next, and the fourth page and fifth page are ejected to the "Y position". As a result, the printed paper is ejected under the condition shown in FIG. 3B. This is a normal condition.

However, conventionally, in case paper jamming occurs in paper ejection during printing or after printing, the printing is operated normally by recovery, but the paper ejection fails to be in a normal condition.

Therefore, in FIG. 5, the request for printing from the first page to the fifth page and the instruction of the offset position progress in the same manner as described in FIG. 4. There is assumed the case where, after the printing, the first page paper ejection is normally performed in "X positions", then paper jamming occurs.

When paper jamming occurs, according to the processing of its recovery, the printing information DT memorized in the printing portion 12 is erased, therefore, by the recovery processing, the printing information DT on and after the second page is re-transmitted from the print control unit 11 to the printing portion 12. On such occasion, providing an instruction containing the offset position is performed prior to the request for the printing of the fourth page. In such a case, because the contents of the instruction evacuating area 24 is "Y position", "X position" is determined as the offset position and instructed.

Therefore, notwithstanding the fact that the fourth page is required to be ejected to "Y position", "X position" is instructed, and all pages from the first to the fifth page are ejected to "X position". As a result, the printed paper is ejected without being offset as shown in FIG. 3C, providing a condition that the divisional point of the document is unclarified.

Furthermore, during printing by the print information DP2 accompanied with the offset request, interruption may be made by printing by other print information DP3. In such a case, due to the presence of the latter interrupting print information DP3, the offset position of the original print information DP2 may be affected, and the paper printed under the original print information DP2 may not be ejected to its proper position.

BRIEF SUMMARY OF THE INVENTION

The present invention has been contrived to dissolve the problematic points as discussed above, and an object of the present invention is to provide a printing apparatus capable of ejecting paper to a proper position even in case the offset request is present in a recovery after printing failure, a printing method for said printing apparatus, and a paper ejecting position control method for said printing apparatus, and an apparatus therefor.

Another object of the present invention is to provide a printing apparatus for ejecting paper to a proper position even when interruption printing is made, a printing method for such printing apparatus, and a paper ejecting position control method for said printing apparatus and apparatus therefor.

The printing method for the printing apparatus of the present invention and the paper ejecting position control method for said printing apparatus are the printing method for a printing apparatus and the paper ejecting position control method for the printing apparatus, comprising a print control unit for outputting print information (page data) containing printing information and offset information (offset request) shown as a paper ejecting position by an offset to the present paper ejecting position, and a printing portion having a printing mechanism for printing on said paper based on the printing information and a paper ejecting mechanism for ejecting the printed paper to the ejecting position based on the offset information. Those methods are characterized in that, the print control unit is provided with the first memory area and the second memory area for storing the information associated with the paper ejecting position; the paper ejecting position is instructed to said printing portion based on the offset information and the contents stored in the first memory area; the contents of the first memory area is updated based on the paper ejecting position instructed to the printing portion; the contents of the second memory area is updated based on the paper ejecting position in which the paper ejecting mechanism actually ejected the paper; and in a recovery after printing failure occurred in the printing portion, the contents of the first memory area are updated based on the contents of the second memory area.

Furthermore, the printing method for the printing apparatus of the present invention and the paper ejecting position control method for said printing apparatus are characterized in that, said offset information is present ("offset request yes"), the other paper ejecting position which differs from the paper ejecting position stored in the first memory area is instructed to the printing portion, and in case there is no offset information ("offset request no"), the paper ejecting position stored in said first memory area is either instructed to said printing portion or not instructed.

Therefore, in the recovery after the printing failure, even in case the offset request is present, the paper can be ejected to the proper position.

Also, the printing method for the printing apparatus of the present invention and the paper ejecting position control method for said printing apparatus are characterized in that, in case the other printing information interrupts halfway with a series of the printing information for carrying out printing over plural sheets of paper, in ejecting the sheets of paper to be printed based on the series of printing information, notwithstanding the presence of the interruption print information, the paper ejecting position is contained in an instruction to said printing portion in coordination only with the offset information contained in said series of printing information.

Moreover, the printing method for the printing apparatus of the present invention and the paper ejecting position control method for said printing apparatus are characterized in that, the print control unit is provided with the first memory area including a common sub-area, a first sub-area, and a second sub-area for storing the information associated with the paper ejecting position; a second memory area for storing the information associated with the paper ejecting position; to the ordinary print information, the paper ejecting position is instructed to the printing portion based on the offset information contained in said print information and the contents stored in the first sub-area, and also the contents of the common sub-area and the first sub-area are updated based on the paper ejecting position instructed to the printing portion; while on the other hand, to the interruption print information, the paper ejecting position is instructed to the printing portion based on the offset information contained in said print information and the contents stored in the common sub-area; and also the contents of the common sub-area and the second sub-area are updated based on the paper ejecting position instructed to the printing portion; the second memory area is updated based on the paper ejecting position actually paper-ejected by the paper ejecting mechanism; and in a recovery after the printing failure with the printing portion, the contents of the first memory area are updated based on the contents of the second memory area.

Therefore, even in case the interruption printing is present, the paper is ejected to the proper position, and even in the presence of the other print information underway, the urged print information can be immediately printed without waiting for the completion of said printing.

The printing apparatus of the present invention and the paper ejecting position control apparatus in said printing apparatus are the paper ejecting position control apparatus comprising a print control unit for outputting print information (page data) containing printing information and offset information (offset request) showing the ejecting position of the paper by the offset to the present paper ejecting position, and a printing portion having a printing mechanism for printing on paper based on the printing information and a paper ejecting mechanism for ejecting the printed paper to the instructed ejecting position, and a printing apparatus comprising said apparatus. They are characterized by having the first memory area and the second memory area for storing the information associated with the paper ejecting position; a paper ejecting position instructing portion for instructing the paper ejecting position to said printing portion based on the offset information and the contents stored in the first memory area; an instructed paper ejecting position update portion for updating the contents of the first memory area based on the paper ejecting position instructed to the printing portion; a resultant paper ejecting position update portion for updating the second memory area based on the paper ejecting position in which the paper ejecting mechanism actually ejected the paper; and a recovery update portion for updating the contents of the first memory area based on the contents of the second memory area, in a recovery after printing failure caused to the printing portion.

Therefore, in the recovery after the printing failure, even in case the offset request is present, the paper can be ejected to the proper position.

The printing apparatus of the present invention and the paper ejecting position control apparatus in said printing apparatus are characterized by having, in the print control unit, the first memory area including a common sub-area, the first sub-area, and the second sub-area, for storing the information associated with the paper ejecting position; the second memory area for storing the information associated with the paper ejecting position; an ordinary paper ejecting position update portion, for an ordinary print information, for instructing the paper ejecting position to the printing portion based on the offset information contained in said print information and the contents stored in the first sub-area, and for updating the contents of the common sub-area and the first sub-area based on the paper ejecting position instructed to the printing portion; an interruption paper ejecting position update portion, for an interruption print information, for instructing the paper ejecting position to the printing portion based on the offset information contained in the print information and the contents stored in the common sub-area, and updating the contents of the common sub-area and the contents of the second sub-area based on the paper ejecting position instructed to the printing portion; a resultant paper ejecting position update portion for updating the second memory area based on the paper ejecting position actually paper-ejected by the paper ejecting mechanism; and a recovery update portion for updating the contents of the first memory area based on the contents of the second memory area in a recovery after printing failure with the printing portion.

Therefore, even in case the interruption printing is present, the paper is ejected to the proper position, and even in the presence of the other print information underway, the urged print information can be immediately printed without waiting for the completion of said printing.

In the printing apparatus and the printing method for this printing apparatus, along with the paper ejecting position control method for the printing apparatus and the paper ejecting position control apparatus in this printing apparatus, various styles can be taken as the print information. The paper ejecting mechanism is capable of ejecting the printed paper to two different positions or more different positions, without having any limitation to the structure. Various systems are applicable for keeping memory of or maintaining the offset position in the printing portion.

The printing failure includes various causes which give effect on holding of print information in the printing portion.

The above and further objects and features of the invention will more fully be apparent from the following detailed description with accompanying drawings.

BRIEF DESCRIPTION OF THE SEVERAL VIEWS OF THE DRAWINGS

FIG. 10 is a view illustrating the method of forming the offset position instruction data of the present invention;

FIG. 21 is a block diagram showing a partial constitution of the printing apparatus of other embodiment of the present invention;

DETAILED DESCRIPTION OF THE INVENTION

Hereinafter, the present invention is described in detail based on the drawings showing its embodiments.

Figure 6:
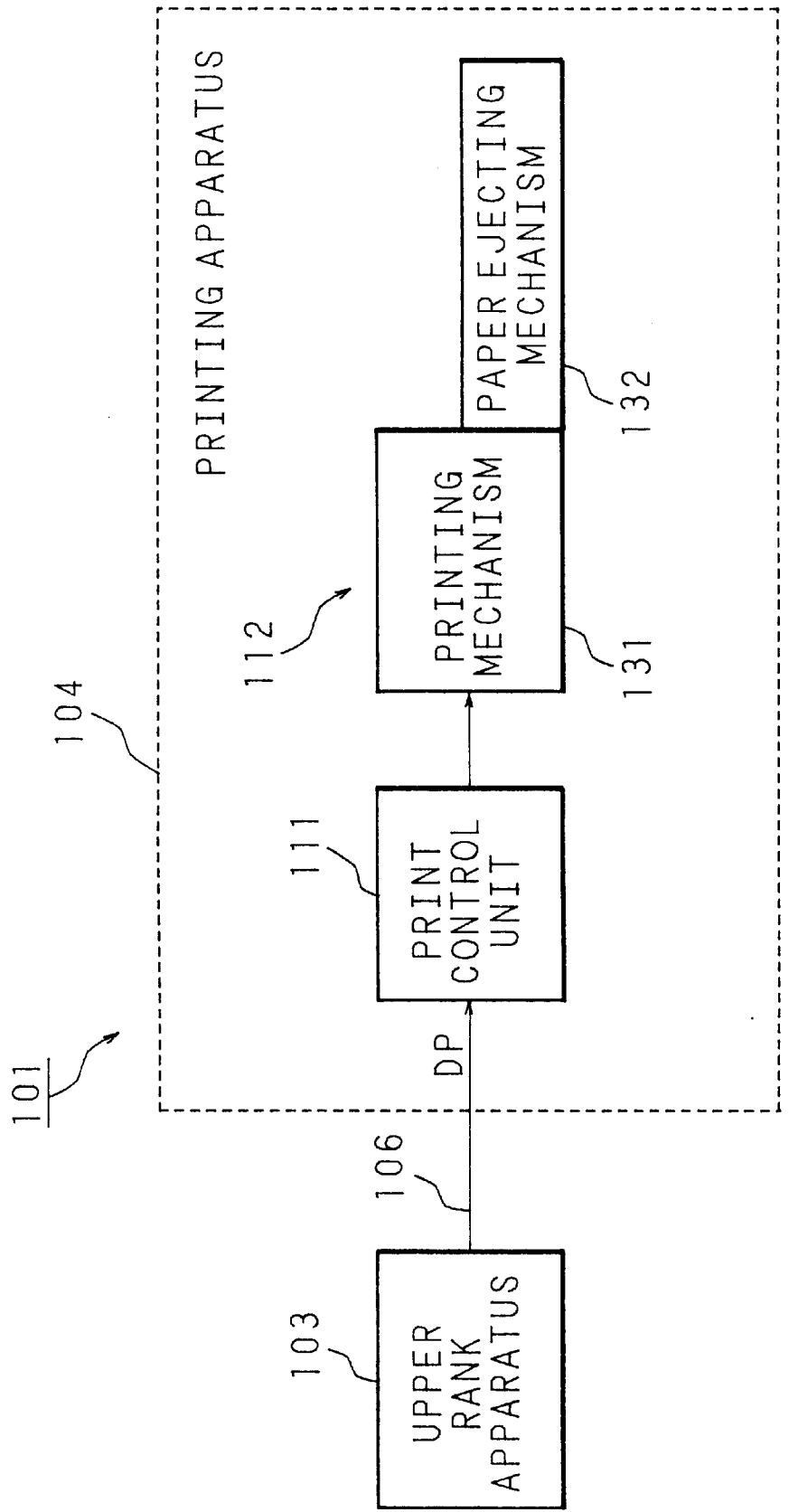
FIG. 6 is a block diagram showing the constitution of the printing system of the present invention.
Figure 7:
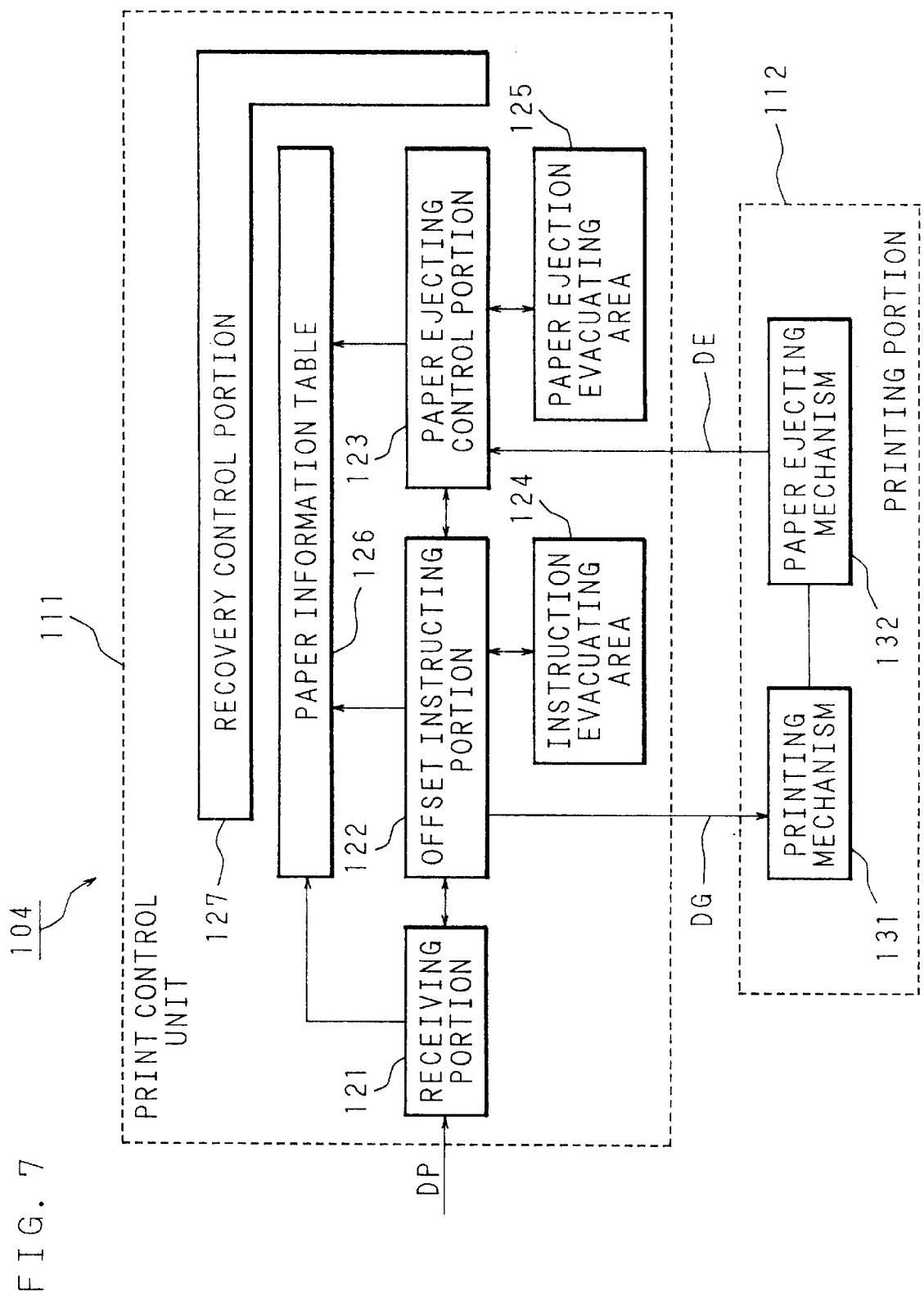
FIG. 7 is a block diagram showing the constitution of the printing apparatus of the present invention.
Figure 11:
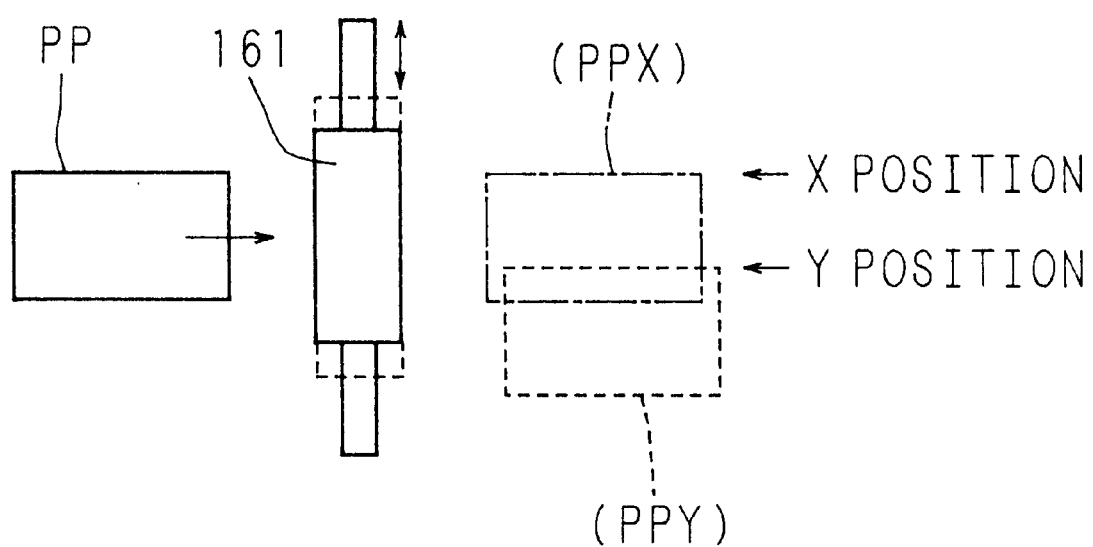
FIG. 11 is a view showing an example of the motion of the paper ejecting mechanism of the present invention.

FIG. 6 is a block diagram showing the constitution of the printing system 101 of the present invention; FIG. 7 is a block diagram showing the constitution of the printing apparatus 104 of the present invention; FIG. 8 is a view showing the print information DP and page data DG; FIG. 9 is a view showing an example of the attribute information DA of the present invention; FIG. 10 is a view illustrating the method of forming the offset position instruction data DFG of the present invention; and FIG. 11 is a view showing an example of the motion of the paper ejecting mechanism 132 of the present invention.

In FIG. 6, the printing apparatus 104 receives (input) the print information DP sent out from the upper rank apparatus 103 through the line 106 such as a network.

Figure 8A:
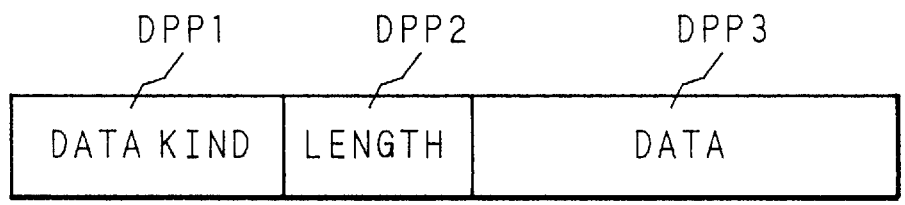
FIG. 8 is a view showing the print information and the page data of the present invention.
Figure 9:
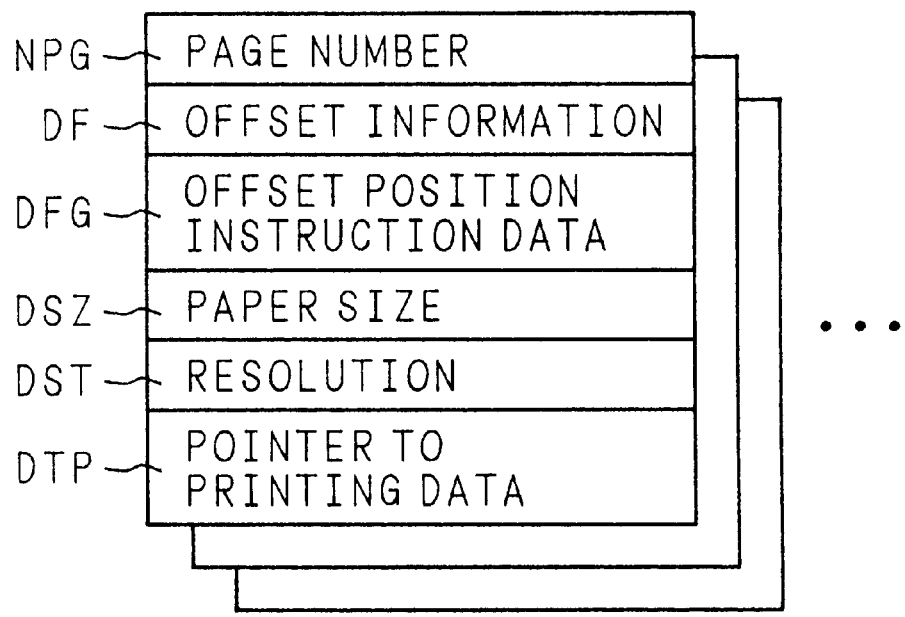
FIG. 9 is a view showing the example of the attribute information of the present invention.

As shown in FIG. 8A, the print information DP is constituted by records in which each record includes a data kind DPP1 which shows the kind of the data of the record, a length DPP2 which shows length of the data of the record, and a data DPP3 which shows contents of the data. Ordinarily, one page portion of the print information DP is constituted by a plurality of the records, and a series of the print information DP are constituted by an integration of them.

In FIG. 7, the printing apparatus 104 comprises the print control unit 111 and the printing portion 112. The print control unit 111 comprises a receiving portion 121, an offset instructing portion 122, a paper ejection control portion 123, an instruction evacuating area 124, a paper ejection evacuating area 125, a paper information table 126, and a recovery control portion 127, and other circuits or functions and the like.

The receiving portion 121 carries out a processing associated with communication. The offset instructing portion 122 decides an offset position (a paper ejecting position) based on the offset information DF and the contents memorized in the instruction evacuating area 124, and outputs an offset position instruction data DFG to the printing portion 112 to carry out instruction of the paper ejecting position, then updates the contents of the instruction evacuating area 124 by the paper ejecting position which is used for the instruction to the printing portion 112. Also, in a recovery after occurring a printing failure in the printing portion 112, the contents of the instruction evacuating area 124 are updated by the contents of the paper ejection evacuating area 125.

The paper ejection control portion 123 receives the information of actual paper ejection in the printing portion 112 and controls the offset position for the recovery. In short, by the paper ejecting position at the time of the paper ejection carried out in the paper ejecting mechanism 132, the paper ejection evacuating area 125 is updated.

In the instruction evacuating area 124, the offset position at which the instruction is made to the printing portion 112 is memorized. In the paper ejection evacuating area 125, the position at which the paper ejection is actually made in the printing portion 112 is memorized. The paper information table 126 memorizes and controls the information associated with paper such as offset information DF. The recovery control portion 127 carries out the control for recovery.

In the print control unit 111, the printing information DT of intermediate type and the attribute information DA are formed in each page based on the print information DP received from the upper rank apparatus 103.

In the printing information DT, there are included code data which necessitate fonts such as character code or graphic code, graphic data containing all the information necessary for drawing a graphic figure, compressed or non-compressed image data, font information such as the character size or rotational position, and the like.

The attribute information DA includes, as shown in FIG. 9, there are included page number NPG to show page, offset information DF which is the information for instructing the paper ejecting position of the printed paper, information DSZ to show size of the paper, information DST to show resolution, and the pointer information DTP which points out the position of the printing information DT to the corresponding attribute information DA, and the like. Furthermore, as the attribute information DA, the contents of the offset position instruction data DFG sent from the print control unit 111 to the printing portion 112 are recorded.

The offset information DF is the information to show as to whether or not to differentiate the paper ejecting position on each page against the one preceding page thereto. In case of differentiating the paper ejecting positions, description may be given as "offset request yes", and in the other case, as "offset request no".

Figure 8B:
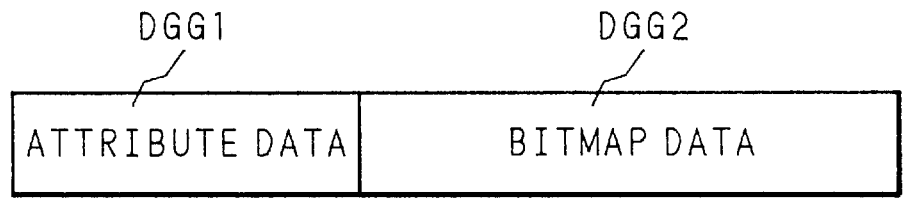

Also, in the print control unit 111, there is formed the page data DG which is the data in the portion of the page for outputting to the printing portion 112 based on the printing information DT and the attribute information DA. As shown in FIG. 8B, the page data DG comprises attribute data DGG1 and bitmap data DGG2. The attribute data DGG1 comprises the offset position instruction data DFG for instructing the offset position of said page and other attribute data. The bitmap data DGG2 is the data which can be printed in the unmodified image in the printing portion 112.

The offset position instruction data DFG is determined by the contents of the offset information DF and the contents of the instruction evacuating area 124, as described above. As shown in FIG. 10, in case nothing is memorized in the instruction evacuating area 124, if the description is "offset request yes", the "X position" is formed as the offset position instruction data DFG, and if "offset request no", the offset position instruction data DFG is not formed. In case the "X position" or "Y position" is memorized in the instruction evacuating area 124, if the description is "offset request yes", as the offset position instruction data DFG there is formed "Y position" or "X position" as the inverse position thereof is formed, and if the description is "offset request no", the offset position instruction data DFG is not formed, or the "X position" or "Y position" as the same position thereof is formed.

And, as the offset position instruction data DFG is sent from the print control unit 111 to the printing portion 112, the contents of the instruction evacuating area 124 are updated by the contents of the offset position instruction data DFG.

The printing portion 112 comprises a printing mechanism 131 and a paper ejecting mechanism 132. The printing mechanism 131 performs printing on paper based on the page data DG. The paper ejecting mechanism 132 ejects the printed paper to the paper ejecting position instructed by the offset position instruction data DFG.

When the paper PP is ejected from the paper ejecting mechanism 132, the paper ejecting information DE containing information of the page number NPG of the ejected page is sent to the paper ejection control portion 123 in the print control unit 111. In the paper ejection control portion 123, on receipt of the paper ejecting information DE, it refers to the attribute information DA and writes the contents of the offset position instruction data DFG recorded on the attribute information DA in the paper ejection evacuating area 125. By this step, in the paper ejection evacuating area 125 there is memorized the position in which the paper ejection is actually performed in the printing portion 112.

The printing apparatus 104 can be established by a hardware circuit composed of MPUs, memories, and other peripheral devices, a program stored in a ROM and the like, various structural parts for executing the electrophotographic process and the like, and other circuits and structural parts, and so forth. Also, as shown in FIG. 11, the paper ejecting structure 132 is provided with a paper ejection roller 161 for conveying the paper PP, and moving it in its axial direction to the "X position" (paper PPX) or "Y position" (paper PPY) designated by the offset position instruction data DFG to evacuate it onto the non-illustrated stacker.

Figure 1:
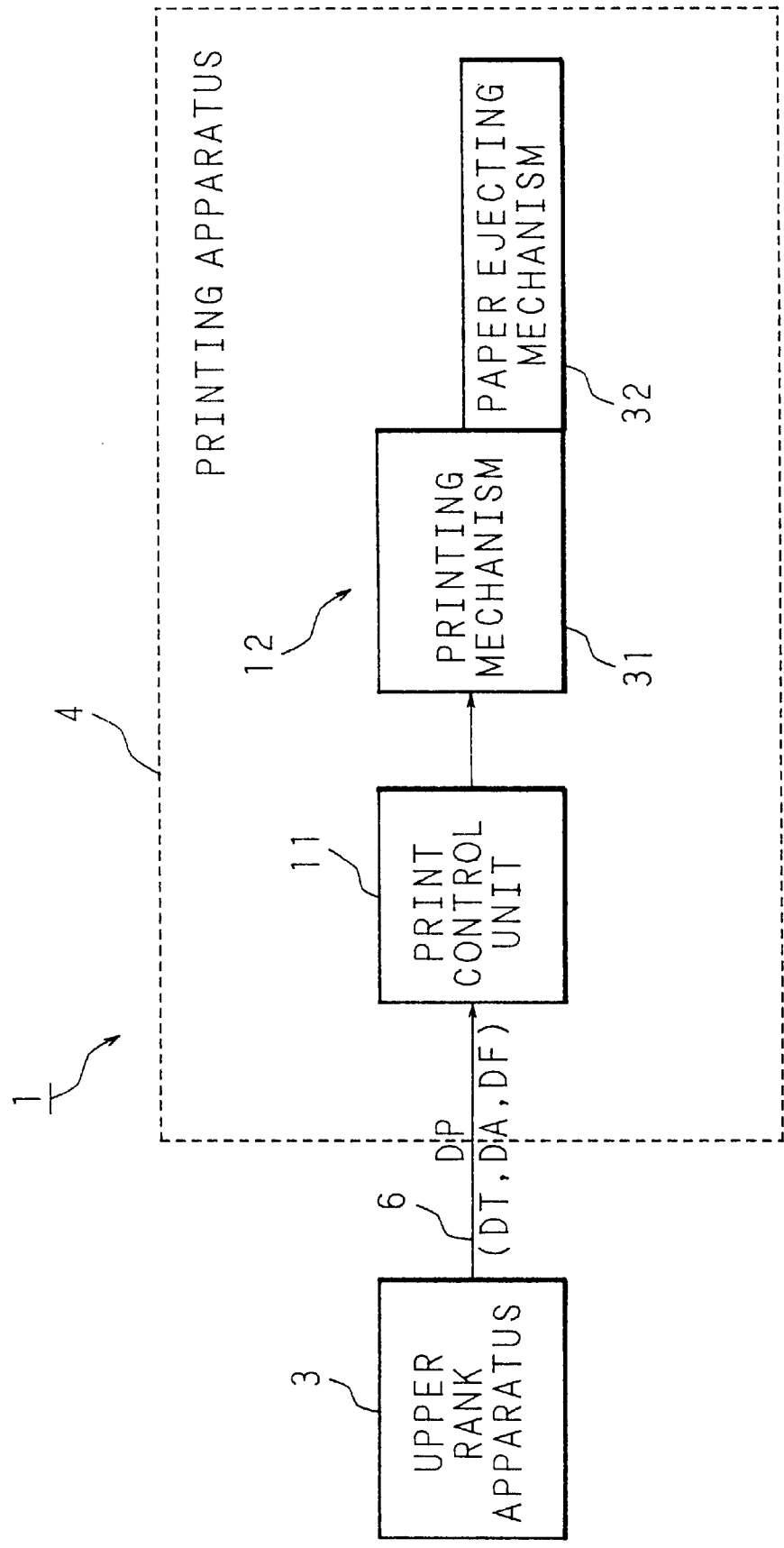
FIG. 1 is a block diagram showing the constitution of the conventional printing system.
Figure 2:
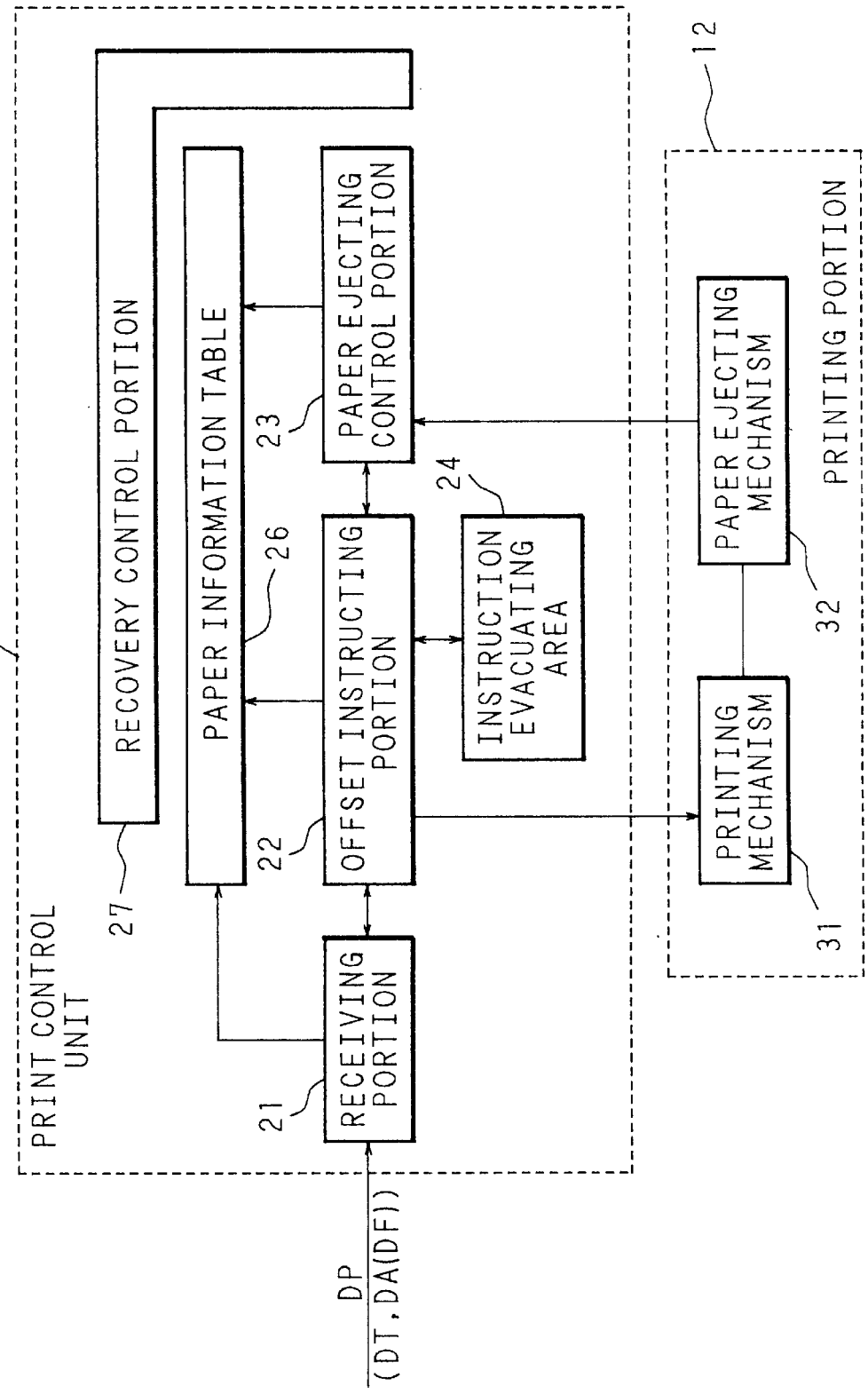
FIG. 2 is a block diagram showing the constitution of the conventional printing apparatus.
Figure 3A:
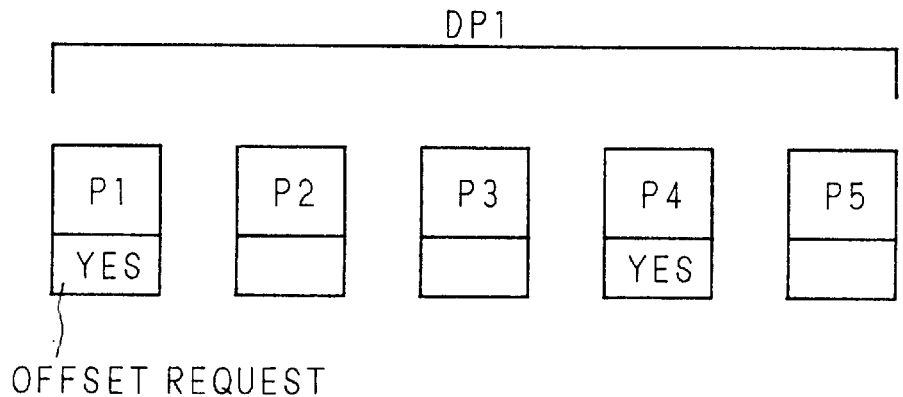
FIG. 3 is a diagram showing the conventional example of paper ejecting condition by the five-page information.

Next, the motion of the printing apparatus 104 is explained with reference to FIG. 12 and FIG. 13. Herein, description is made on the case where the print information DP is the print information DP1 for five pages as in FIG. 3A as explained in the paragraph relating to the prior art.

Figure 12:
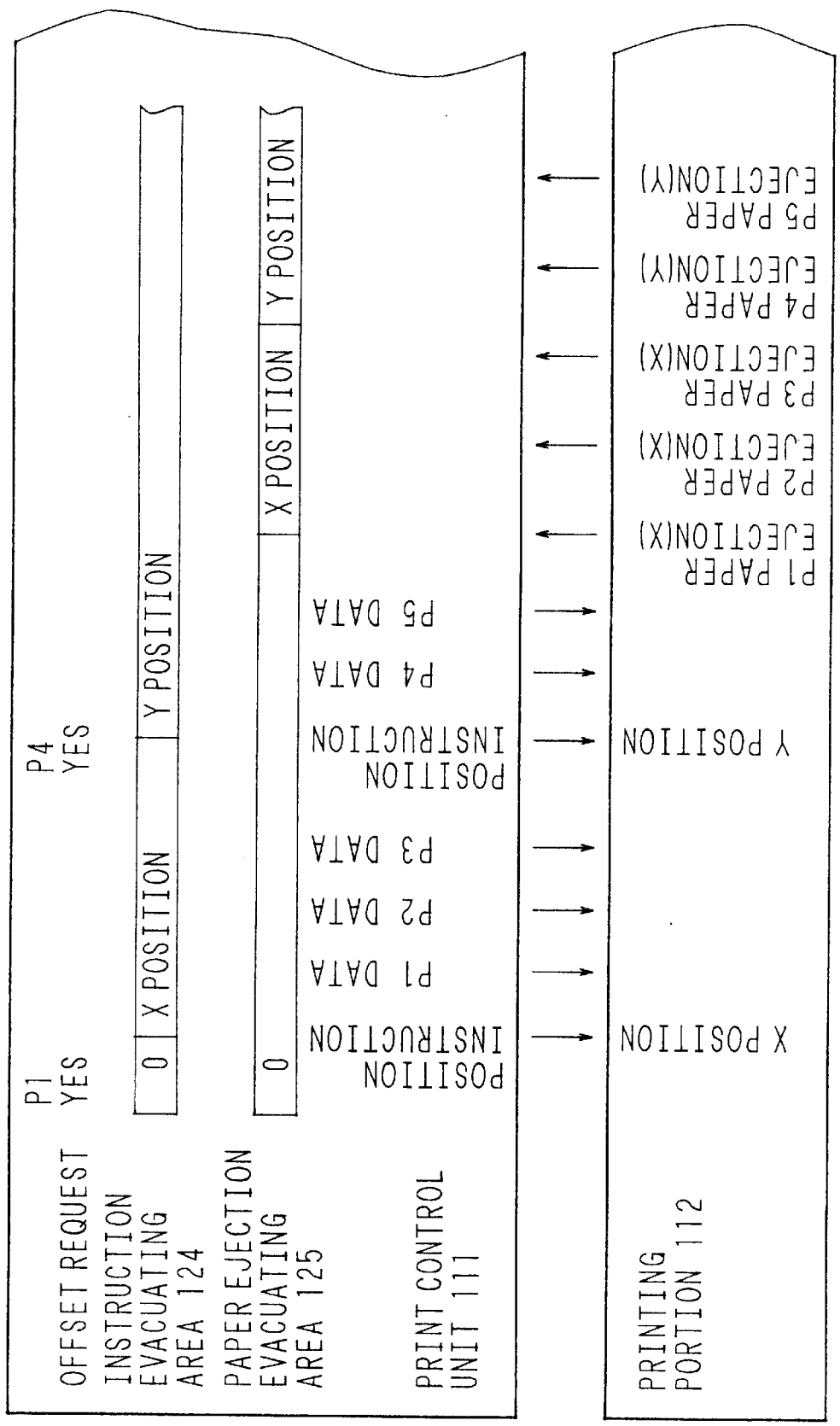
FIG. 12 is a view for illustrating the motion of the printing apparatus of the present invention in normal mode.
Figure 13:
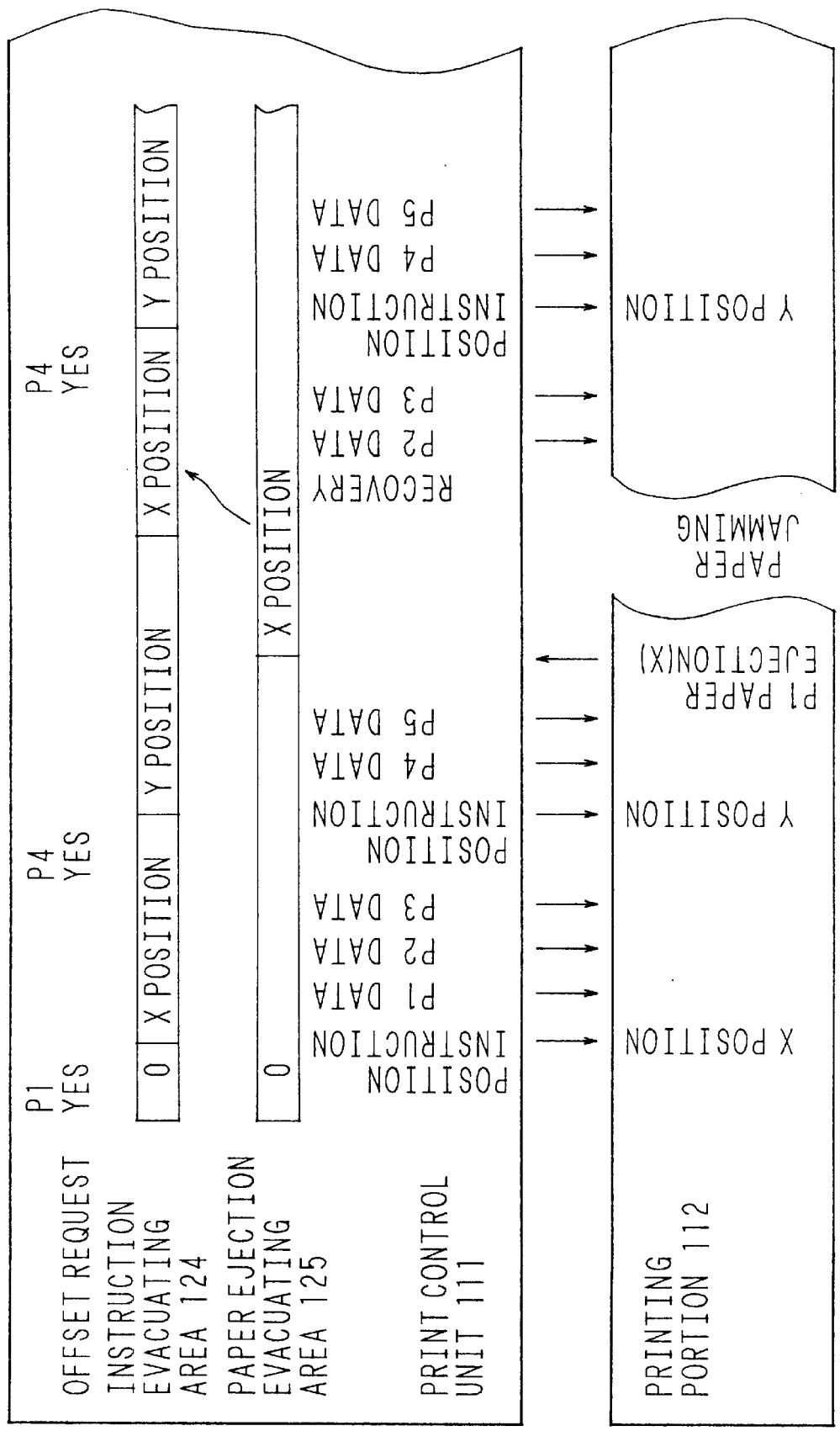
FIG. 13 is a view for illustrating the motion in the recovery after the printing failure in the printing apparatus of the present invention.

FIG. 12 is a view for illustrating the motion of the printing apparatus 104 of the present invention in normal mode, and FIG. 13 is a view for illustrating the motion of the printing apparatus 104 of the present invention in recovery mode after the printing failure occurred.

In FIG. 12, as starting up the printing apparatus 104, nothing is memorized in the instruction evacuating area 124 and the paper ejection evacuating area 125, which are shown by "0". When the printing apparatus 104 receives the print information DP1 from the upper rank apparatus 103, the print control unit 111 converts the information to the intermediate type printing information DT and attribute information DA, which are temporarily memorized in the memory. Thereafter, page data DG is formed based on the printing information DT and the attribute information DA, and outputted data by data from the print control unit 111 to the printing portion 112.

At first, since the first page is "offset request yes", prior to the request for printing of the first page, the offset position instruction data DFG is outputted from the print control unit 111 to the printing portion 112. As the contents of the instruction evacuating area 124 is "0" as its initial value, the "X position" is determined as the offset position based on the initial value and "offset request yes", and instructed. With the instruction of the "X position", the contents of the instruction evacuating area 124 is updated to "X position". In the printing portion 112, the "X position" is memorized as the paper ejecting position for the first page. Thereafter, the respective bitmap data DGG2 for the first page, second page, and third page are sent from the print control unit 111 to the printing portion 112.

And, since the fourth page is "offset request yes", prior to the request for printing the fourth page, the offset position instruction data DFG is outputted from the print control unit 111 to the printing portion 112. As the contents of the instruction evacuating area 124 is "X position", based on it and "offset request yes", the "Y position" is determined as the offset position and instructed. With the instruction of the "Y position", the contents of the instruction evacuating area 124 is updated to "Y position". In the printing portion 112, the "Y position" is memorized as the paper ejecting position for the fourth page. Thereafter, the respective bitmap data DGG2 for the fourth page and fifth page are sent from the print control unit 111 to the printing portion 112.

Subsequently, or in parallel therewith, printing is performed in the printing portion 112, and paper ejection is made in order of the first page, second page, and third page to the "X position". At the fourth page next, the paper ejecting position is changed to "Y position", and the fifth page is also paper ejected to the same "Y position". On each paper ejection, the paper ejecting information DE is outputted from the printing portion 112 to the print control unit 111.

In the print control unit 111, with the timing of having received the paper ejecting information, the contents of the paper ejection evacuating area 125 is updated by the offset position instruction data DFG recorded in the attribute information DA.

Figure 3B:
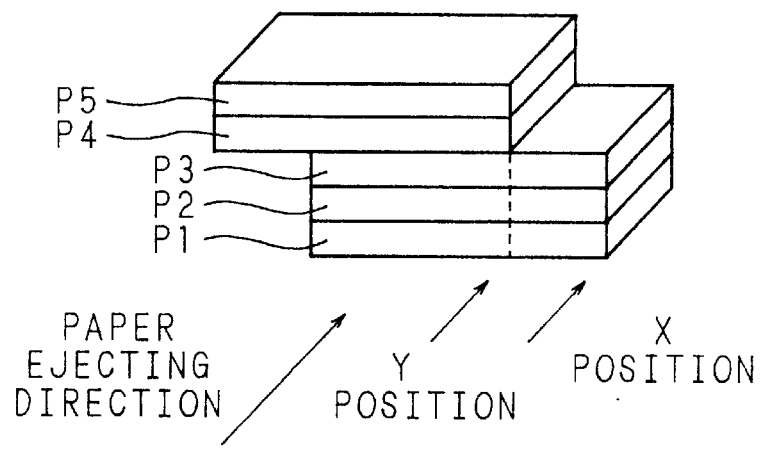
Figure 3C:
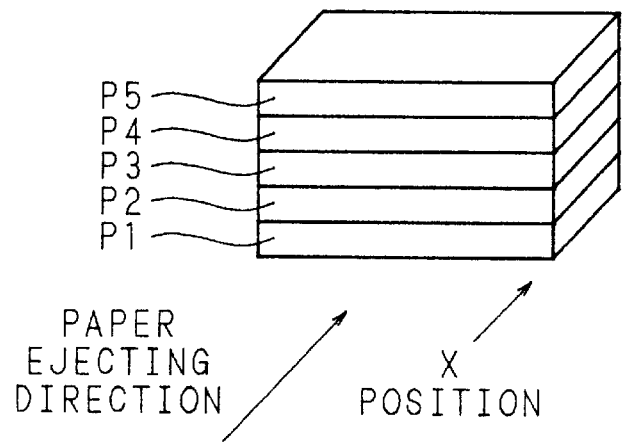
Figure 4:
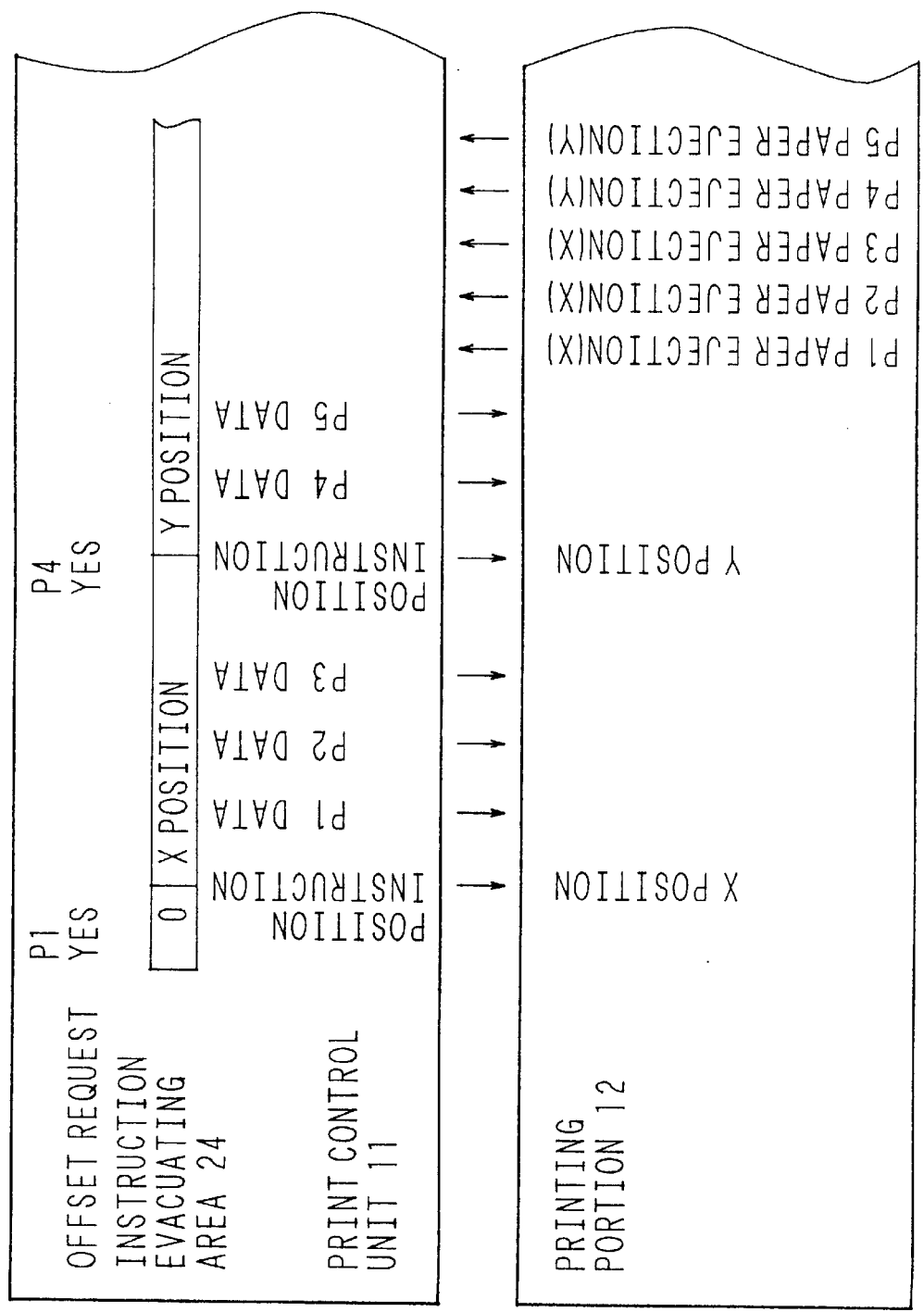
FIG. 4 is a view for illustrating the conventional condition of instruction of the offset position.
Figure 5:
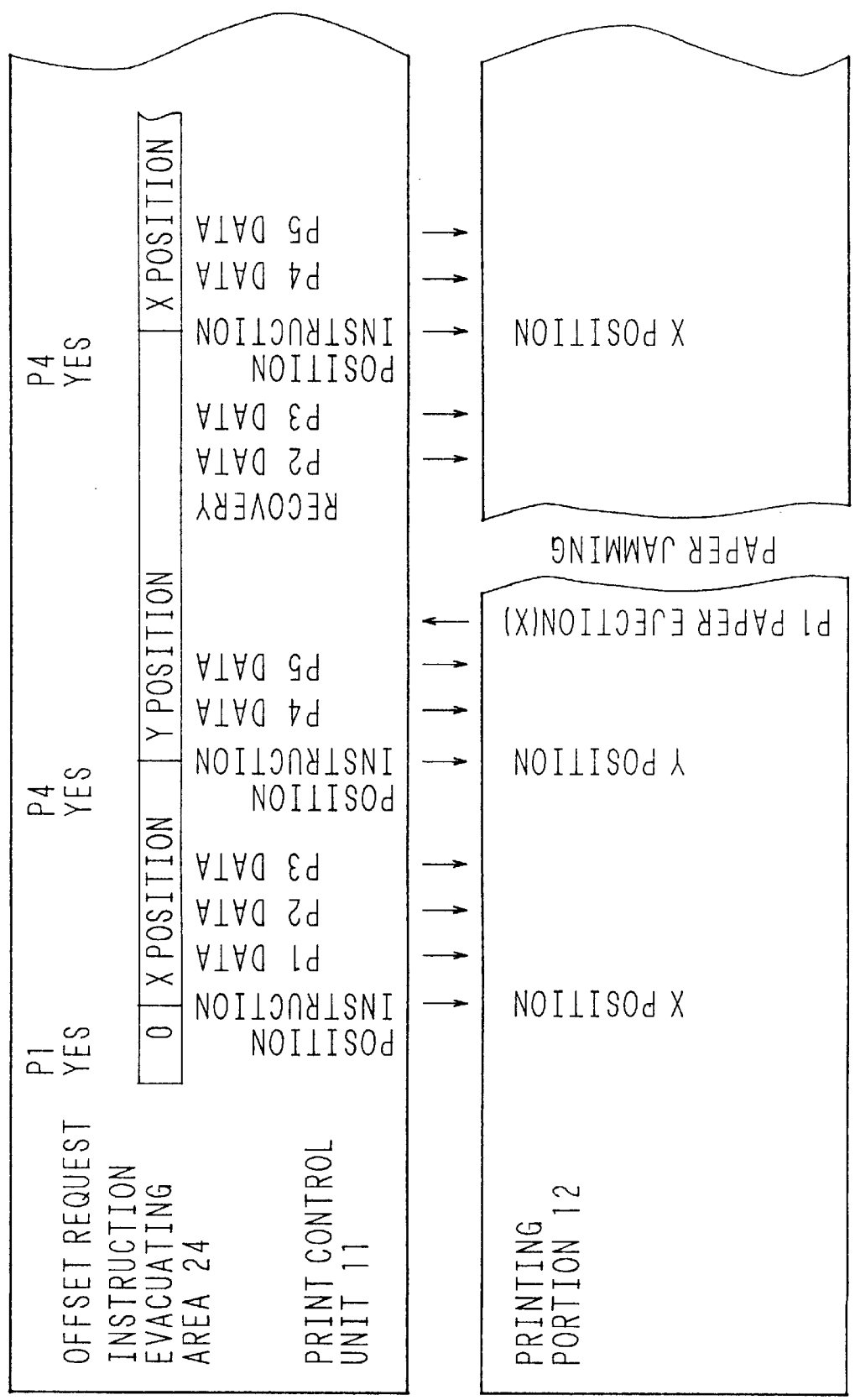
FIG. 5 is a diagram for illustrating the conventional condition of the offset position in a recovery.

After all, the printed paper is ejected under the condition as shown in FIG. 3B. This is the normal condition.

Next, the motion in the case where the printing failure has occurred is explained.

In FIG. 13, the request for printing from the first page to the fifth page, and the output of the offset position instruction data DFG are the same as those explained in FIG. 12. There is assumed the case where, after printing, the paper ejection on the first page is normally done in "X position", and then paper jamming occurred.

When paper jamming occurs, by the recovery processing following the reinstatement, the page data DG in and after the second page are re-transmitted from the print control unit 111 to the printing portion 112. Prior to the re-transmission of the page data DG, the contents of the paper ejection evacuating area 125 are copied to the instruction evacuating area 124, and as a result the contents of the instruction evacuating area 124 become the same as those of the paper ejection evacuating area 125.

As shown in FIG. 13, at the start of the recovery processing, there are memorized the "Y position" in the instruction evacuating area 124 and the "X position" in the paper ejection evacuating area 125, respectively. The contents of the instruction evacuating area 124 become the "X position" by the copying process.

Prior to the transmission of the page data DG of the fourth page, the offset position instruction data DFG is outputted. In such case, since the contents of the instruction evacuating area 124 are "X position", the offset position instruction data DFG becomes "Y position". Thereafter, the page data DG of the fourth page and the fifth page are transmitted, then the printing is performed, and the paper is ejected to the paper ejecting position instructed by the offset position instruction data DFG.

As a result, the printed paper is ejected under the condition shown in FIG. 3B. Therefore, in the recovery after the printing failure, the paper is ejected to the proper position even in case of the offset request to the print information DP1.

Furthermore, in FIG. 13, if the paper jamming occurred not after the paper ejection of the first page but for example before the ejection of the first page, nothing is memorized in the paper ejection evacuating area 125 at the start of the recovery, so that by the copying to the instruction evacuating area 124 "Y position" is written in the instruction evacuating area 124. Then, at the time of the re-transmission of the first page data DG, because of the "offset request yes", the offset position instruction data DFG becomes "X position" and therefore normal instruction is performed.

Furthermore, in FIG. 13, if the paper jamming occurred for example after the paper ejection of the fourth page, at the start of the recovery, "Y position" is memorized in the paper ejection evacuating area 125, so that by the copying to the instruction evacuating area 124 "0" is written in the instruction evacuating area 124. Therefore, the subsequent offset position instruction data DFG is properly determined.

Next, the processing motion of the printing apparatus 104 is explained based on the flow chart.

Figure 14:
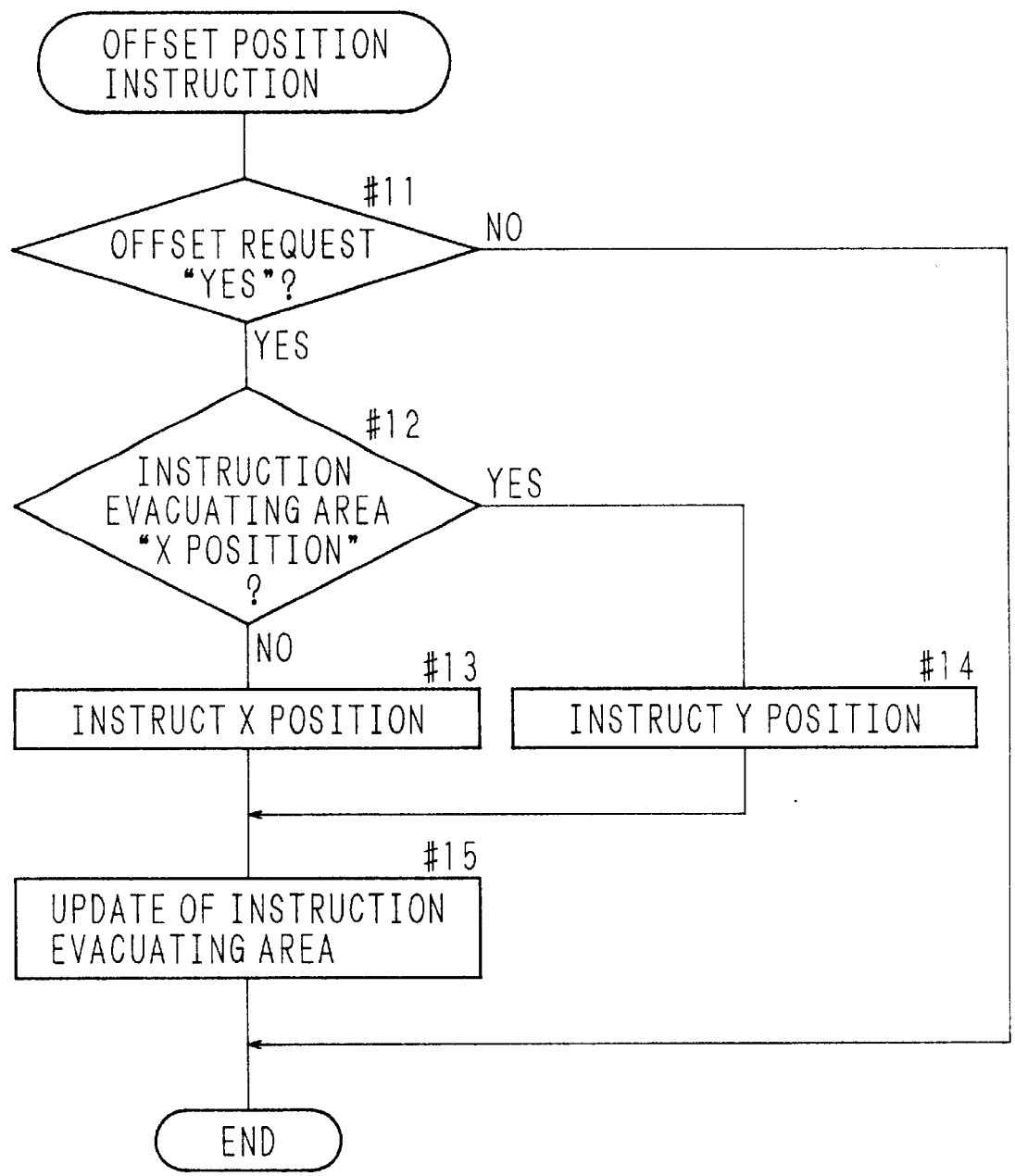
FIG. 14 is a flow chart showing the processing motion of the offset position instruction of the present invention.
Figure 15:
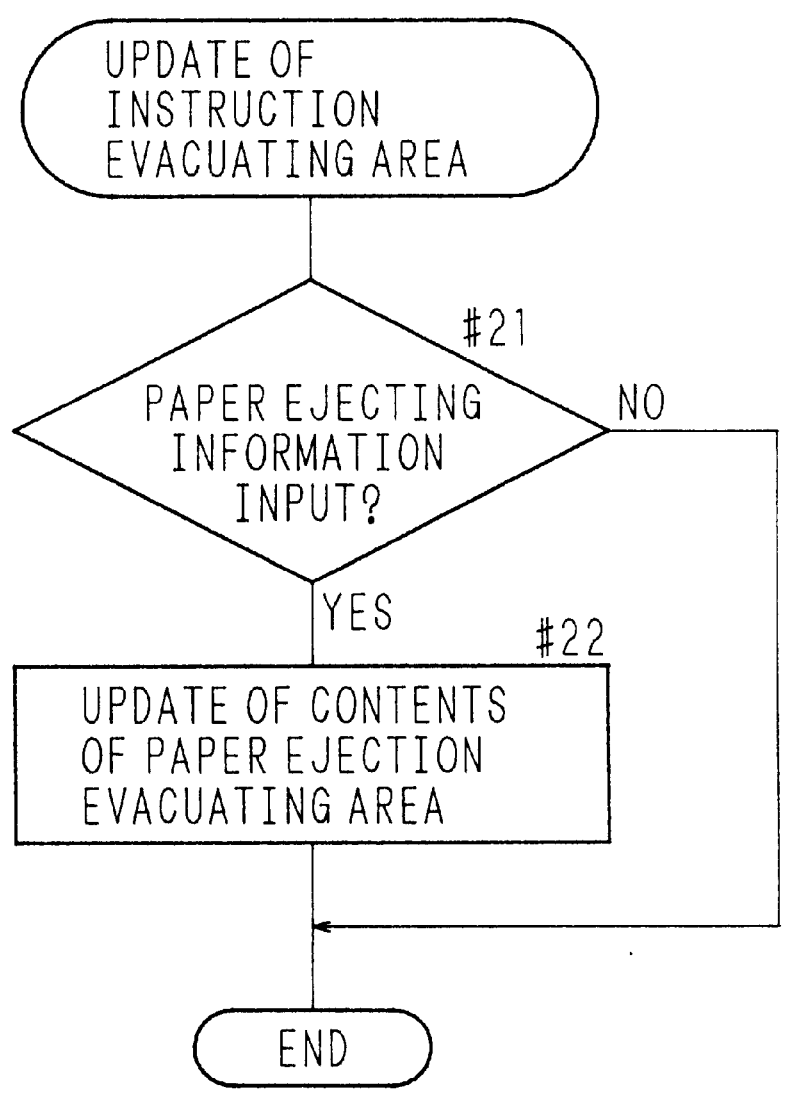
FIG. 15 is a flow chart showing the update process of the paper ejection evacuating area of the present invention.

FIG. 14 is a flow chart showing the processing motion of the offset position instruction of the present invention; FIG. 15 is a flow chart showing the update process of the paper ejection evacuating area 125 of the present invention; and FIG. 16 is a flow chart showing the recovery process of the present invention.

In FIG. 14, in case the offset information DF contains "offset request yes" ("yes" at #11), if the contents of the instruction evacuating area 124 are "X position", then the offset position instruction data DFG is set to "Y position" (#12, #14), and in any other case, ste it to "X position" (#12, #13). And, according to the offset position instruction data DFG the instruction evacuating area 124 is updated (#15).

In FIG. 15, when the paper ejection is made in the printing portion 112 and the paper ejecting information DE is thereby inputted to the print control unit 111 ("yes" at #21), the contents of the paper ejection evacuating area 125 are updated by the offset position instruction data DFG recorded as the offset information DF (#22).

Figure 16:
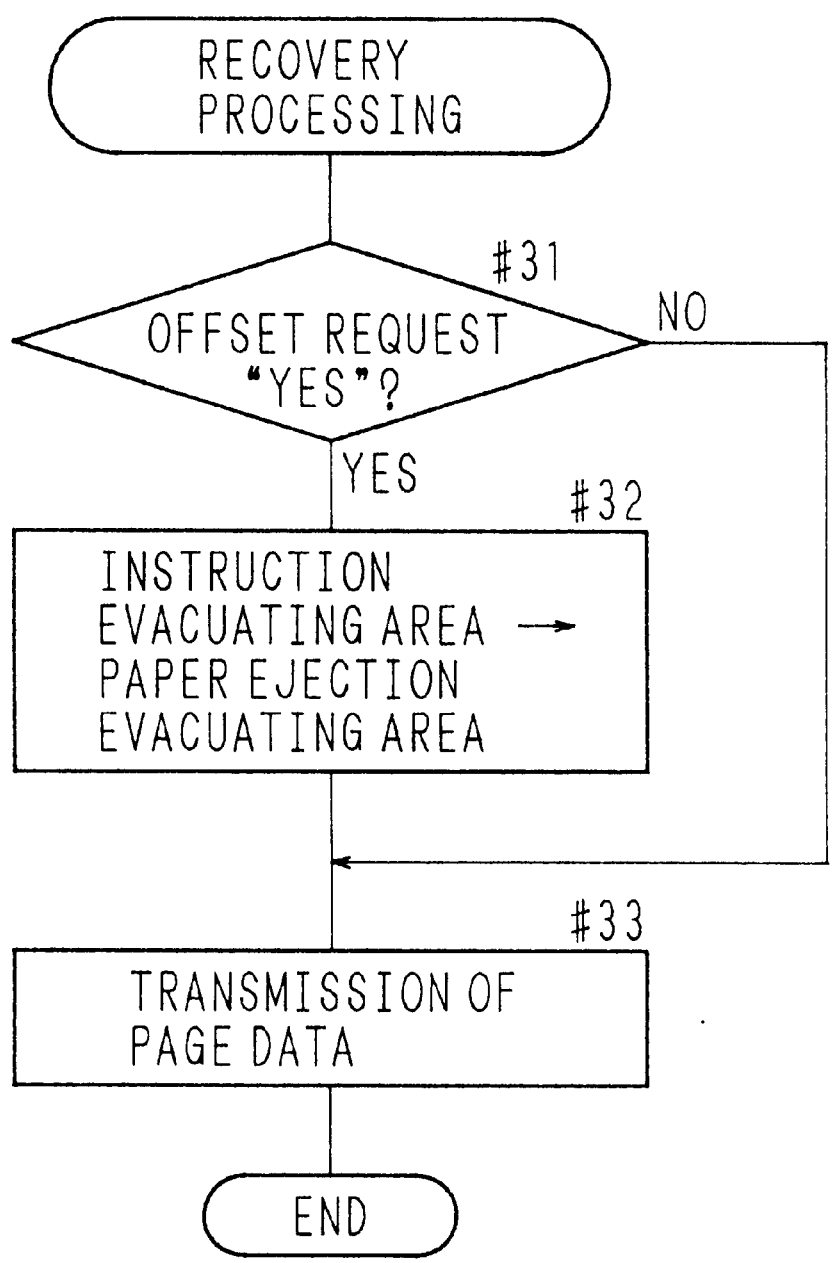
FIG. 16 is a flow chart showing the recovery process of the present invention.

In FIG. 16, when the offset information DF includes "offset request yes" ("yes" at #31), the contents of the paper ejection evacuating area 125 are copied to the instruction evacuating area 124 (#32). Thereafter, the page data DG necessary for the recovery is re-transmitted (#33).

By the way, it may occur that, when a certain series of print information DP2 is received, and printing of the page data DG2 is executed based on the series, in the course of which other print information DP3 interrupts, and the printing of the page data DG3 based on the interruption print information DP3 is executed earlier. In such a case, conventionally it may occur that, by the presence of the later-interruption print information DP3, the offset position in the original print information DP2 is affected and the paper printed by the original print information DP2 fails to be ejected to the proper position.

Next, concrete description is made on the case where the interruption print information DP3 comes in.

Figure 18A:
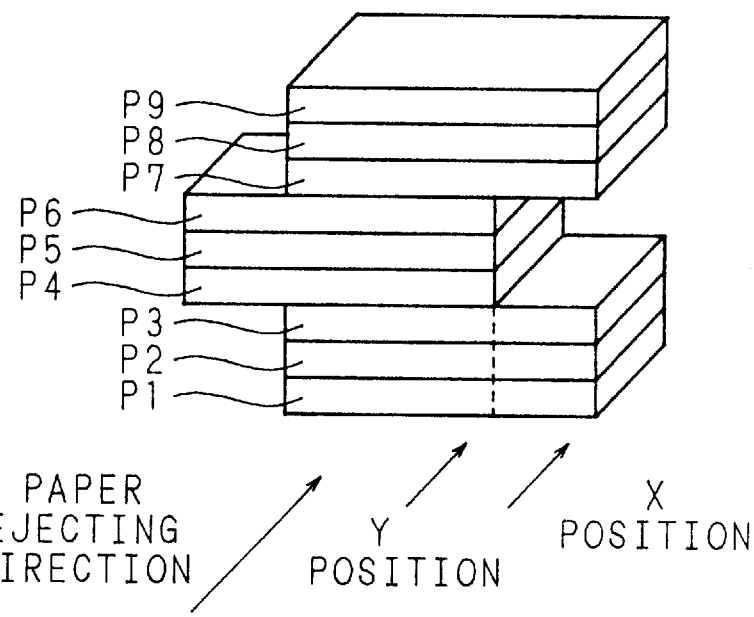
FIG. 18 is a view showing the proper paper ejection condition by the print information of the present invention.
Figure 18B:
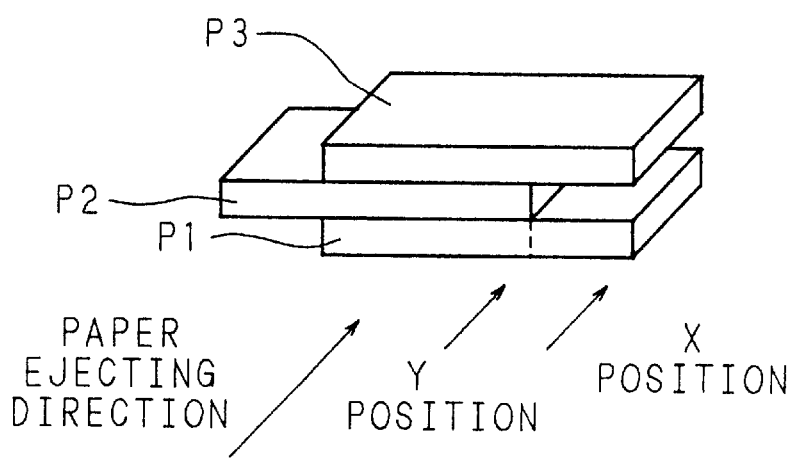
Figure 19:
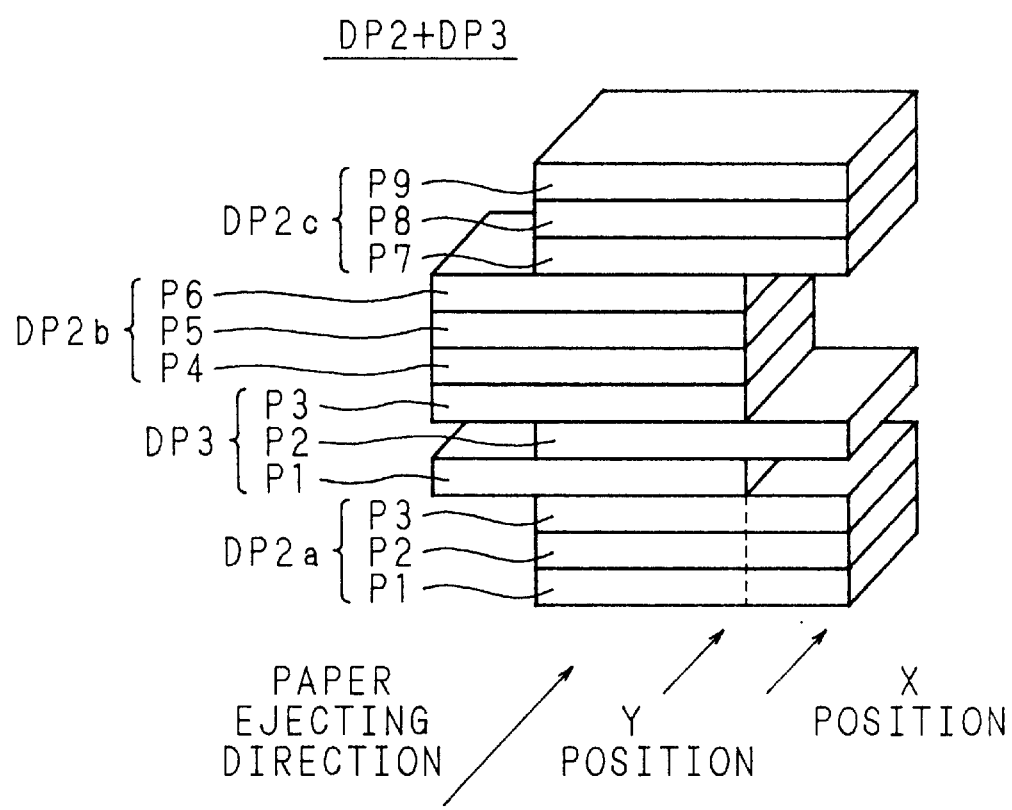
FIG. 19 is a view showing the proper paper ejection condition when the interruption of the present invention is made.

FIG. 17 is a view showing the print information DP2 for nine pages and the interruption print information DP3 for three pages to it of the present invention; FIG. 18 is a view showing the proper paper ejection conditions for the respective cases of the print information DP2, DP3 perse of the present invention; FIG. 19 is a view showing the proper paper ejection condition in case the interruption is made of the present invention; and FIG. 20 is a view showing the improper paper ejection condition when the interruption is made of the present invention.

Figure 17A:
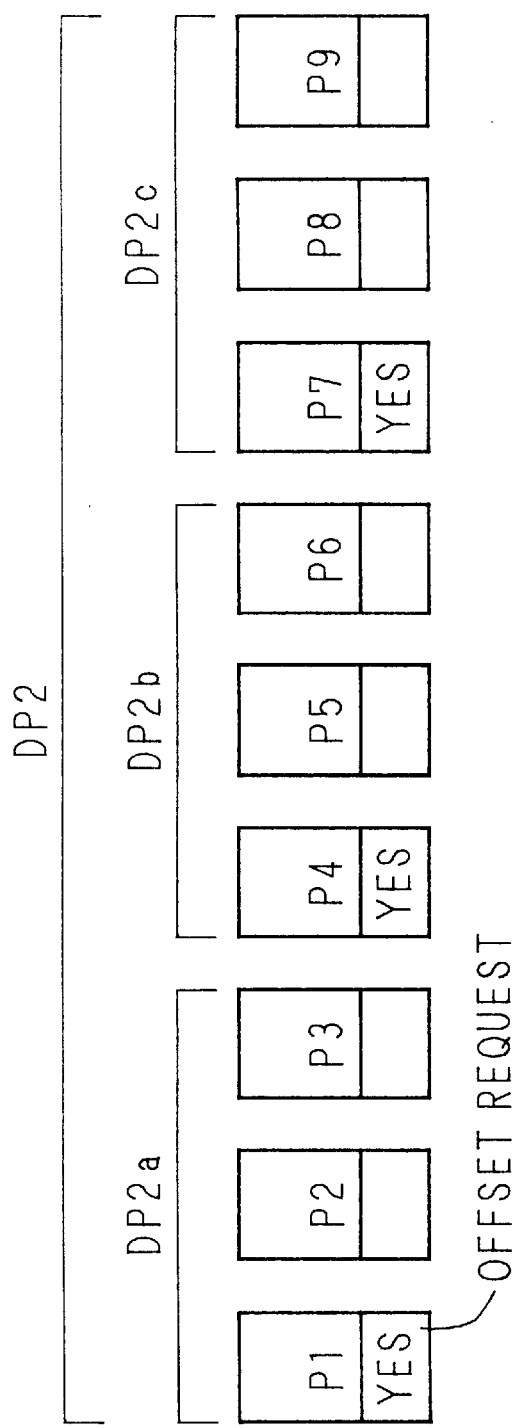
FIG. 17 is a view showing the ordinary print information and the interruption print information of the present invention.

In FIG. 17A, there are shown a series of the print information DP2 for nine pages in total, comprising the partial print information DP2a, b, c for three pages each with attachment of the information "offset request yes" on the first page, fourth page, and seventh page, respectively. There is shown in FIG. 18A a condition in which the printing is performed by the print information DP2 only and paper ejection is made.

Figure 17B:
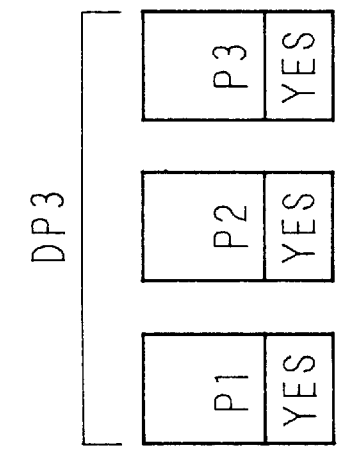

In FIG. 17B there is shown the print information DP3 for three pages in total with attachment of the information "offset request yes" on each order of page. There is shown in FIG. 18B a condition in which the printing is performed by the print information DP3 only and paper ejection is made.

There is assumed a case where the print information DP3 interrupts in the course of the printing of the print information DP2 and the printing of the print information DP3 is made in the interval between the printing of the partial print information DP2a and the printing of the partial print information DP2b.

Figure 20A:
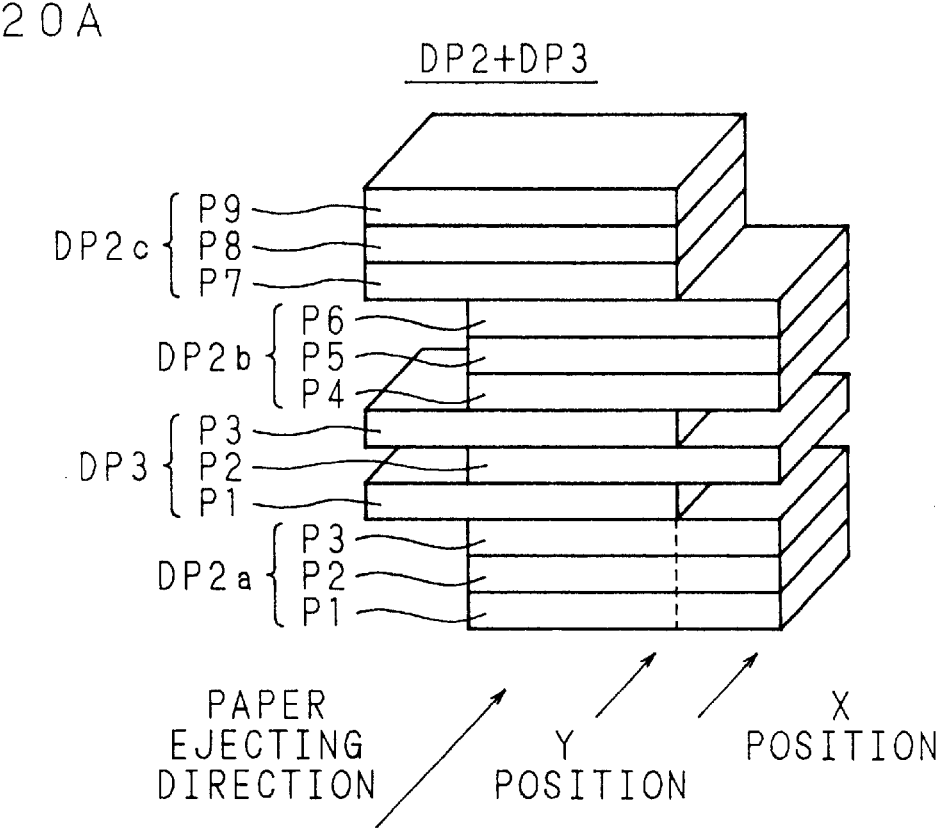
FIG. 20 is a view showing the improper paper ejection condition when the interruption of the present invention is made.

In FIG. 20A there is shown the paper ejection condition of the case where no consideration is made that the print information DP3 is made by interruption. In other words, this state is the same as in the case where the ordinary printing is made in order of the partial print information DP2a, print information DP3, partial print information DP2b, and partial print information DP2c, and the paper ejecting position is determined according to the respective "offset request yes".

Figure 20B:
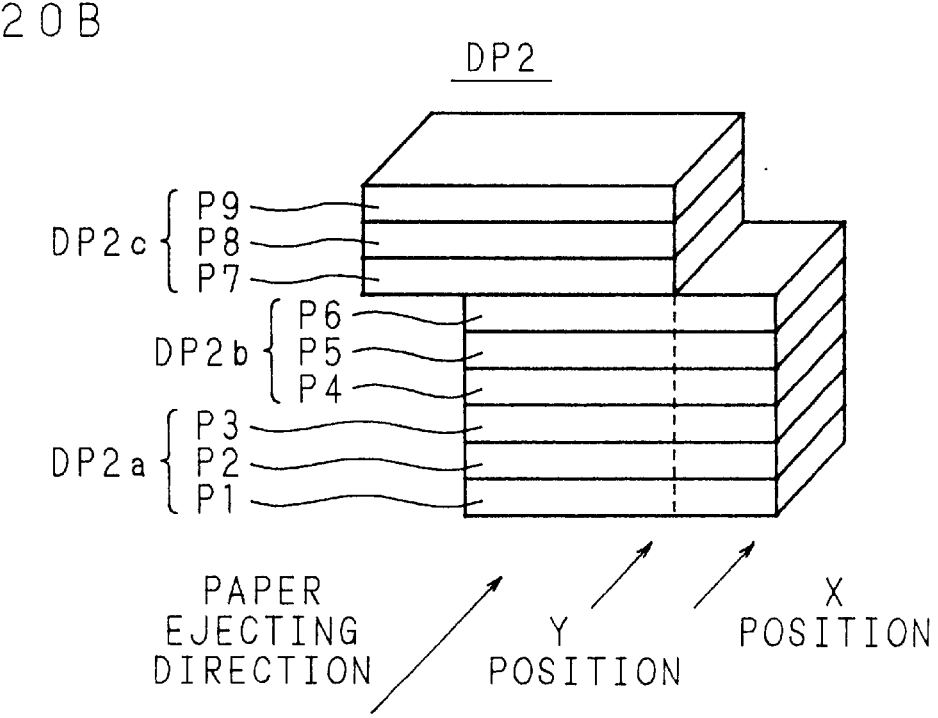

In such a case, when the user who has interrupted the print information DP3 extracts the paper printed by the print information DP3 from the paper which is in the condition of FIG. 20A, the remaining sheets of the printed paper on the print information DP2 come to be in the condition where no offset is made between the partial print information DP2a and the partial print information DP2b, as shown in FIG. 20B.

In such a case, there is a problem that the user who has instructed the print information DP2 is not aware of the fact that the partial print information DP2a and the partial print information DP2b are the different kinds of documents, and eventually treats them as a single document. In other words, since the user on the interrupting side is aware of the fact of interruption, such user can recognize the evacuation condition of the paper even if it is different from the normal state, but the user on the side being interrupted is beyond knowledge of the change in the paper ejection condition caused by interruption, because the interruption occurred while the latter is unaware.

Therefore, if there is anything which is in the course of printing, another printing is required to be undertaken after completion of said printing, thus involving a problem that no immediate printing can be made for the imminent print information DP.

Therefore, explanation is given on the printing apparatus 104B which is free from such problem.

FIG. 21 is a block diagram showing a partial constitution of the printing apparatus 104B which is another embodiment of the present invention. As the printing apparatus 104B is basically the same as the printing apparatus 104 about which the explanation was previously made, only the points of difference are explained here, and as to other points the explanation is omitted or simplified.

In FIG. 21, the printing apparatus 104B comprises an offset instructing portion 122B, a paper ejection control portion 123B, an instruction evacuating area 124B, and a paper ejection evacuating area 125B. The instruction evacuating area 124B is provided with the three sub-areas of the common sub-area 124a, first sub-area 124b, and second sub-area 124c. The paper ejection evacuating area 125B is provided with the three sub-areas of the common sub-area 125a, first sub-area 125b, and second sub-area 125c.

The instruction evacuating area 124B determines, for the ordinary print information DP2, the offset position based on the offset information DF contained in the print information DP2 and the contents stored in the first sub-area 124b, and outputs the offset position instruction data DFG to give instruction of the paper ejecting position to the printing portion 112. And, depending on the paper ejecting position on which the instruction to the printing portion 112 is made, it updates the contents of the common sub-area 124a and the first sub-area 124b. Furthermore, the instruction evacuating area 124B determines, for the interruption print information DP3, the offset position based on the offset information DF contained in the print information DP3 and the contents stored in the common sub-area 124a, and outputs the offset position instruction data DFG to give instruction of the paper ejecting position to the printing portion 112. And, depending on the paper ejecting position on which the instruction to the printing portion 112 is made, it updates the contents of the common sub-area 124a and the second sub-area 124c. And, in a recovery after the printing failure has occurred with the printing portion 112, depending on the contents of the paper ejection evacuating area 125B, it updates the contents of the instruction evacuating area 124B.

The paper ejection evacuating area 125B updates the paper ejection evacuating area 125B depending on the paper ejecting position at the time when the paper ejection is made in the paper ejecting mechanism 132. Whether the print information DP received from the upper rank apparatus 103 is the ordinary one or the interrupting one is memorized in the paper information table 126 and controlled.

Next, the motion of the printing apparatus 104B is explained with reference to FIG. 22.

Figure 22:
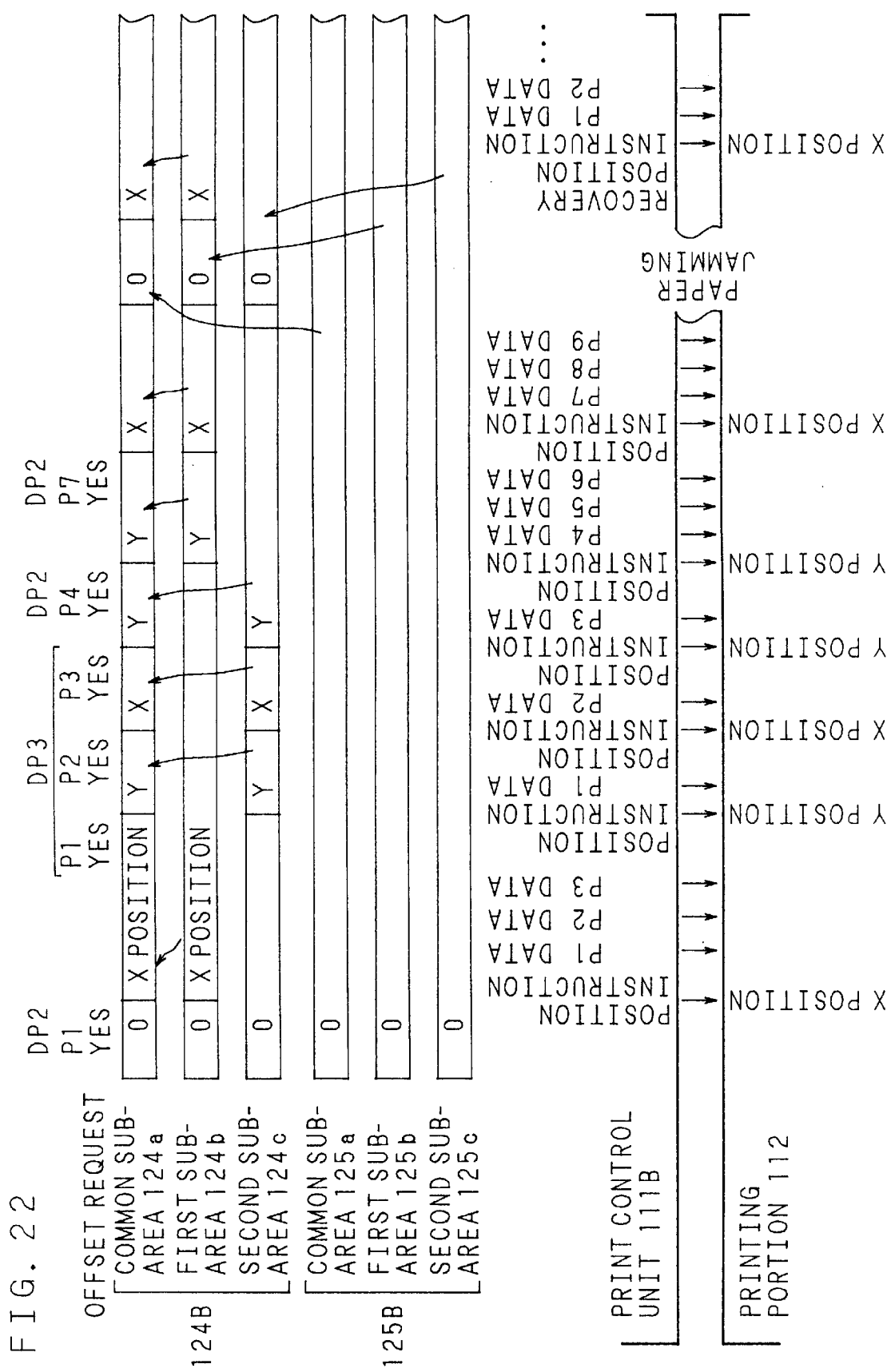
FIG. 22 is a view for illustrating the motion of the printing apparatus of the present invention.

FIG. 22 is a view for illustrating the motion of the printing apparatus 104B of the present invention.

In FIG. 22, at the time when the power of the printing apparatus 104B is turned on, nothing is memorized in the instruction evacuating area 124B and the paper ejection evacuating area 125B. When the printing apparatus 104B receives the print information DP2, DP3 from the upper rank apparatus 103, the print control unit 111B converts it into the intermediate type printing information DT and the attribute information DA and once stores it in a memory. Whether the print information DP2, DP3 is ordinary one or by interruption is memorized in the paper information table 126. Thereafter, based on the printing information DT relating to the print information DP2 and the attribute information DA, the page data DG is formed, and outputted in order from the print control unit 111B to the printing portion 112.

At first, since the first page is "offset request yes", prior to the request for printing the first page, an offset position instruction data DFG is outputted from the print control unit 111B to the printing portion 112. In outputting the offset position instruction data DFG, the offset position is determined. Since the print information DP2 is ordinary one and not the interruption print information, the offset position is determined based on the contents of the first sub-area 124b.

With respect to the contents of the first sub-area 124b, the initial amount is "0", and based on it and "offset request yes", the "X positions" is determined as the offset position and instructed. With the instruction of the "X positions", the contents of the first sub-area 124b is updated to "X position". After the contents of the first sub-area 124b has been updated to "X position", the contents of the first sub-area 124b is copied to the common sub-area 124a, and as a result the contents of the common sub-area 124a also becomes "X position".

In the printing portion 112, the "X position" is memorized as the first page paper ejecting position. Thereafter, the respective bitmap data DGG2 for the first page, second page and third page are sent from the print control unit 111B to the printing portion 112.

Subsequently, the page data DG by the interruption print information DP3 is transmitted. Since the first page of the print information DP3 is "offset request yes", prior to the request for printing the first page, the offset position instruction data DFG is outputted from the print control unit 111B to the printing portion 112. In the output of the offset position instruction data DFG, the offset position is determined. Since this is the printing information with interruption of the print information DP3, the offset position is determined based on the contents of the common sub-area 124a.

As the contents of the common sub-area 124a is "X position", based on it and "offset request yes", the "Y position" is determined as the offset position and instructed. With the instruction of the "Y position", the contents of the second sub-area 124c is updated to "Y position". After the updating of the contents of the second sub-area 124c to "Y position", the contents of the second sub-area 124c is copied to the common sub-area 124a, and as a result the contents of the common sub-area 124a also becomes "Y position".

In the printing portion 112, the "Y position" is memorized as the first page paper ejecting position of the print information DP3. Thereafter, the bitmap data DGG2 for the first page is sent from the print control unit 111B to the printing portion 112.

Thus, in case of the "offset request yes" by ordinary print information DP2, based on the contents of the first sub-area 124b, and in case of the "offset request yes" by the interruption print information DP3, based on the contents of the common sub-area 124a, the offset position is determined, respectively. After the instruction made according to the determined offset position, depending on the said offset position, the contents of the first sub-area 124b or the second sub-area 124c is updated. And, the updated contents is copied to the common sub-area 124a.

In case such processes are repeated thereafter and all the print information DP2,3 has been printed, the printed sheets of paper are ejected under the condition shown in FIG. 19. As apparent from the paper ejection condition shown in FIG. 19, in moving from the print information DP3 to the partial print information DP2b of the print information DP2, notwithstanding the partial print information DP2b being "offset request yes", no offsetting is performed. However, when attention is given only to the print information DP2, paper ejection is made in the condition of mutual offsetting of the partial print information DP2a, b, c.

Therefore, when the user who has made interruption of the print information DP3 extracts the printed paper based on the print information DP3 from the printed sheets of paper in the condition of FIG. 19, the remaining printed sheets of paper relating to the print information DP2 become the proper paper ejection condition pursuant to the offset information DF in the print information DP2, as shown in FIG. 18A.

Therefore, the user who requested the print information DP2 can obtain the printed sheets of paper in proper paper ejection condition, notwithstanding the interruption. Viewed from the user on the interrupting side, even in case of there being the sheet in process of printing, without waiting for the completion of said printing, the urgent print information P3 can be immediately printed.

Now, referring to FIG. 22, in printing in the printing portion 112, due to the paper jamming during the printing of the first page, by the recovery processing after the recovery thereof, the page data DG from the first page of the print information DP2 is re-transmitted from the print control unit 111B to the printing portion 112. In this case, prior to the re-transmission of the page data DG, the contents of the paper ejection evacuating area 125B are respectively copied to the instruction evacuating area 124B, by which the contents of the instruction evacuating area 124B become the same as those of the paper ejection evacuating area 125B. According to the example of FIG. 22, the contents of the paper ejection evacuating area 125B are all "0", so that as a result of the copying, all the contents of the instruction evacuating area 124B become "0".

In other words, because the contents of the instruction evacuating area 124B are in the same condition as in the case of initially transmitting the print information DP2, in case of the recovery, when the page data DG is transmitted from the first page of the print information DP2, the offset position is properly determined according to the offset information DF, and the proper paper ejecting position instruction is made.

Next, the processing motion of the printing apparatus 104B is explained based on the flow chart.

Figure 23:
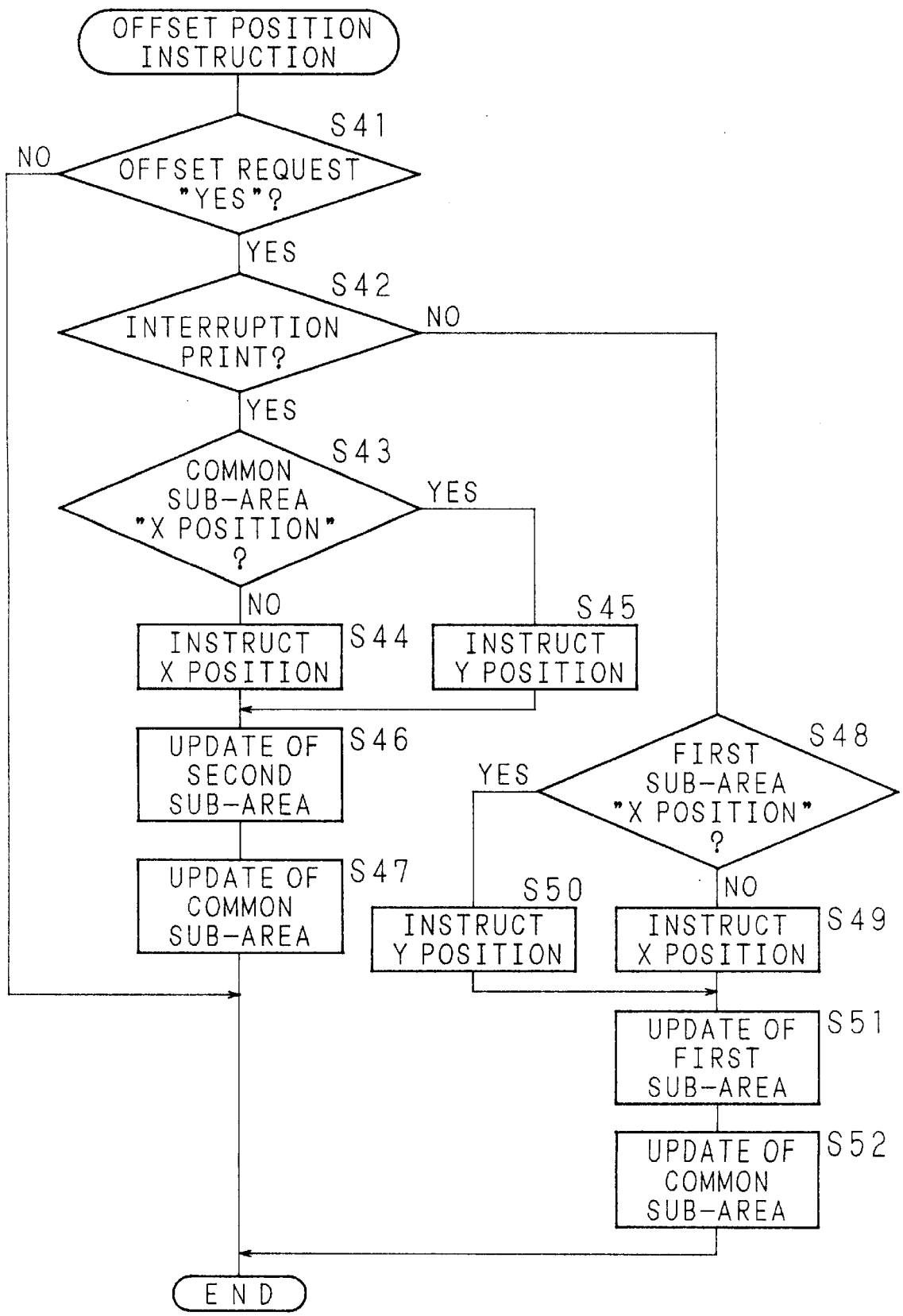
FIG. 23 is a flow chart showing the processing motion of position instruction of the present invention.
Figure 24:
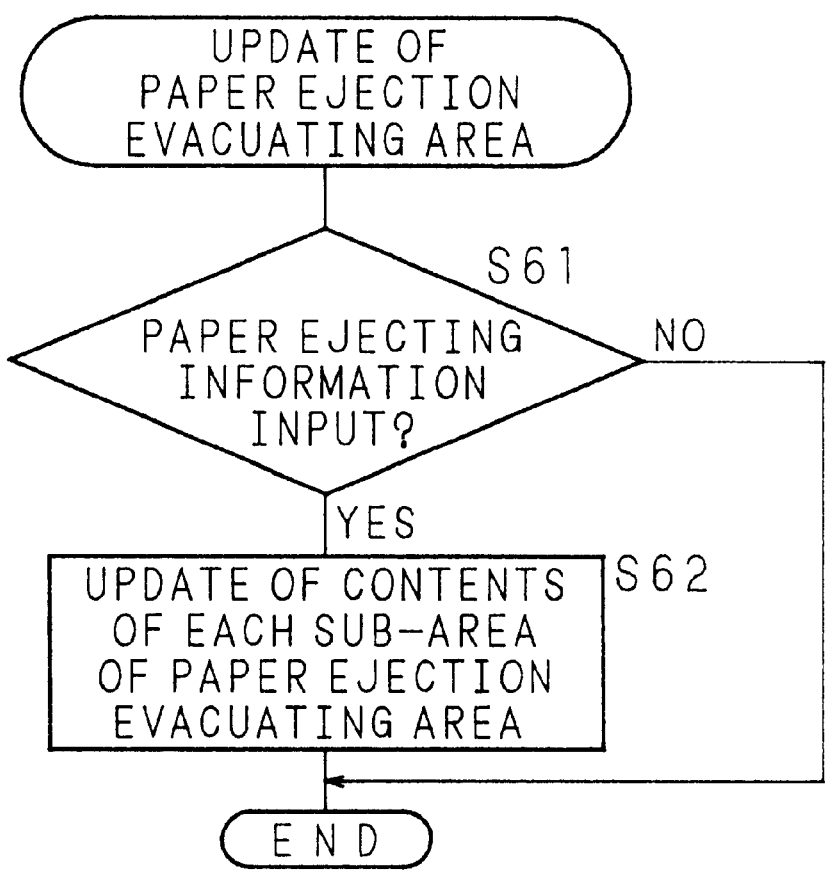
FIG. 24 is a flow chart showing the update process of the paper ejection evacuating area of the present invention.
Figure 25:
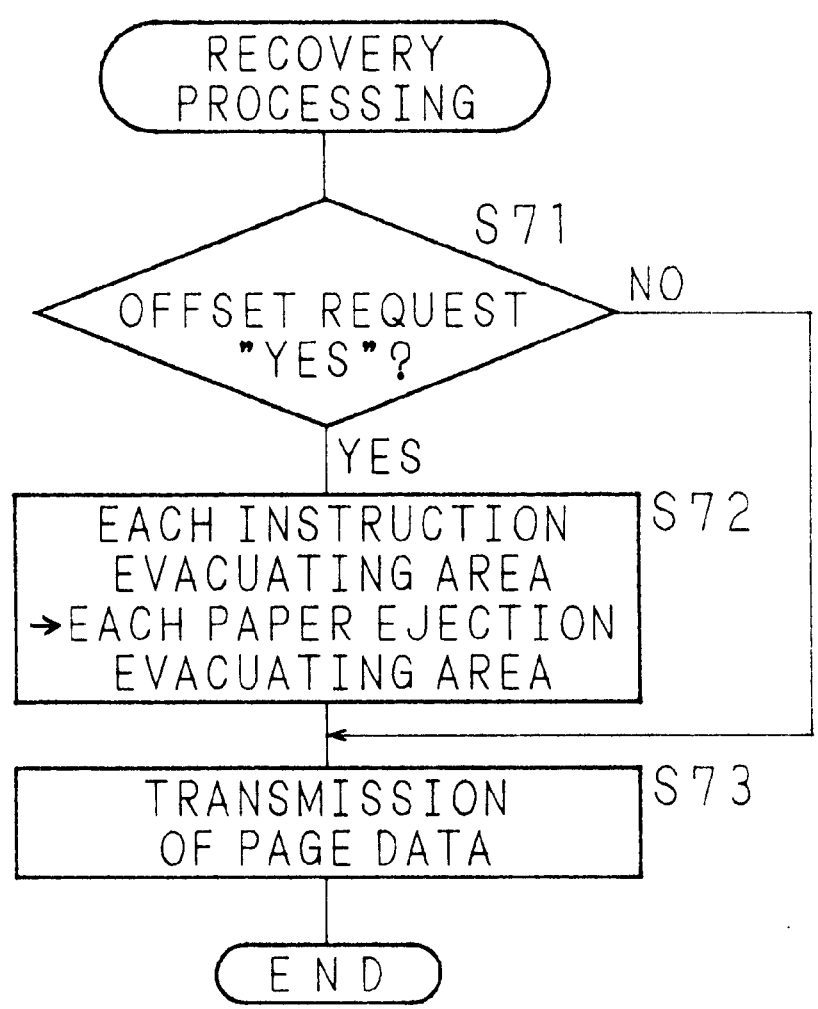
FIG. 25 is a flow chart showing the recovery process of the present invention.

FIG. 23 is a flow chart showing the processing motion of the offset position instruction of the present invention; FIG. 24 is a flow chart showing the update processing of the paper ejection evacuating area of the present invention; and FIG. 25 is a flow chart showing the recovery processing of the present invention.

In FIG. 23, in case the offset information DF includes "offset request yes" ("yes" at #41), the processing is divided depending on whether it is the interruption print information DP or not. In case of the interruption print information DP ("yes" at #42), if the contents of the common sub-area 124a are on "X position", the offset position instruction data DFG is set to be "Y position" (#43, #45), while in other case, set to be "X position" (#43, #44). And, by the offset position instruction data DFG, the second sub-area 124c is updated (#46), and the common sub-area 124a is also updated (#47).

In case of not being the interruption print information DP ("no" at #42), if the contents of the first sub-area 124b is "X position", the offset position instruction data DFG is set to be "Y position" (#48, #50), and in other case, set to be "X position" (#48, #49). And, by the offset position instruction data DFG, the first sub-area 124b is updated (#51), and the common sub-area 124a is also updated (#52).

In FIG. 24, when paper ejection is made in the printing portion 112 and thereby the paper ejecting information DE is inputted to the print control unit 111B ("yes" at #61), the contents of each sub-area in the paper ejection evacuating area 125B are updated (#62). At that time, when the information is the paper ejecting information DE on the print information DP which is not the interruption print information DP, the first sub-area 124b is updated by the offset position instruction data DFG recorded as the offset information DF. When it is the paper ejecting information DE on the print information DP which is the interruption print information DP, the second sub-area 124c is updated by the offset position instruction data DFG recorded as the offset information DF. In either case, the updated contents are copied to the common sub-area 124a.

In FIG. 25, in case the offset information DF includes "offset request yes" ("yes" at #71), the contents of each sub-area of the paper ejection evacuating area 125B are copied to each sub-area of the respectively corresponding instruction evacuating area 124B (#72). Thereafter, there is made re-transmission of the page data DG which is necessary for the recovery (#73).

As shown above, in the printing apparatus 104B, the print information DP is classified into an ordinary one (not the interrupted one) and the interrupting one, and according to the respective classes, there are provided the exclusive sub-areas of first sub-area 124b, 125b or second sub-area 124c, 125c and the common sub-areas 124a, 125a which are used commonly with them. Consequently, the offset position is not affected by the print information DP of other kind, and the paper ejection is to be made to the proper offset position pursuant to the offset information DF of the print information DP. Also, even in case of the printing failure, recovery is made to bring the paper ejecting position to the proper place.

In the embodiments mentioned above, description is made on the case where the print information DP is transmitted from the upper rank apparatus 103. However, in place of the upper rank apparatus 103, an image input device or a character input device such as image scanner or OCR may be connected so that the print information DP is inputted from them. Alternatively, it may be possible to constitute such image input device or character input device in one-piece with or in separate body from the printing apparatus 104, 104B.

In the foregoing embodiments, the instruction evacuating areas 124, 124B correspond to the first memory area of the present invention, and the paper ejection evacuating areas 125, 125B correspond to the second memory area of the present invention. In case the paper ejection evacuating area 125 is omitted, the area for recording the offset position instruction data DFG in the attribute information DA may be used as the second memory area. It is also possible to omit the common sub-area 125a in the printing apparatus 104B.

The page data DG in the above embodiments corresponds to the printing information of the present invention, and the bitmap data DGG2 to the printing information of the present invention, respectively.

In the foregoing embodiments explanation has been made on the case where the paper ejecting positions are two of "X position" and "Y position". However, the paper ejection may be carried out in three or more positions. The structure of the paper ejecting mechanism 132 can be various types other than that shown in FIG. 11.

Besides, the constitutions of the whole or part of the printing system 101, printing apparatus 104, 104B, print control unit 111, 111B, etc., contents or order of processing, timing of processing, etc. may be optionally modified in line with the purport of the present invention.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A printing method for a printing apparatus, said printing apparatus including a print control unit for outputting print information containing printing information consisting of contents to be printed and offset information showing a paper ejecting position by an offset to the present paper ejecting position; and a printing portion having a printing mechanism for printing on paper based on said printing information, and a paper ejecting mechanism for ejecting said paper based on said offset information, said method comprising the steps of:

providing said print control unit with a first memory area and a second memory area for storing information associated with a paper ejecting position;

providing an instruction containing a first paper ejecting position to said printing portion based on said offset information and contents stored in said first memory area;

updating the contents of said first memory area based on said first paper ejecting position contained in said instruction provided to said printing portion;

updating the contents of said second memory area based on said paper ejecting position in which said paper ejecting mechanism is actually paper-ejected; and updating the contents of said first memory area based on the contents of said second memory area in a recovery operation carried out by said printing apparatus after a printing failure which has occurred in said printing portion.

2. A printing method for a printing apparatus according to claim 1, further comprising the steps of:

providing an instruction containing a second paper ejecting position which differs from said first paper ejecting position stored in said first memory area to said printing portion, in case said offset information is present; and providing or not providing an instruction containing said paper ejecting position stored in said first memory area to said printing portion, whenever no offset information is present.

3. A printing method for a printing apparatus according to claim 2, further comprising:

providing an instruction containing said first paper ejecting position to said printing portion in coordination only with said offset information contained in a series of said print information whenever other print information interrupting halfway with said series of the print information for carrying out printing over plural sheets of said paper, notwithstanding the presence of the print information which has caused the interruption, in ejecting said paper to be printed based on said series of the print information.

4. A printing method for a printing apparatus according to claim 1, further comprising the step of:

providing an instruction containing said first paper ejecting position to said printing portion in coordination only with said offset information contained in a series of said print information whenever other print information interrupting halfway with said series of the print information for carrying out printing over plural sheets of said paper, notwithstanding the presence of the print information which has caused the interruption, in ejecting said paper to be printed based on said series of the print information.

5. A printing method for a printing apparatus, said printing apparatus including a print control unit for outputting print information containing printing information consisting of contents to be printed and offset information showing a paper ejecting position which is offset from the present paper ejecting position; and a printing portion having a printing mechanism for printing on paper based on said printing information and a paper ejecting mechanism for ejecting said paper based on said offset information, said method comprising the steps of:

providing said print control unit with a first memory area including a common sub-area, a first sub-area, and a second sub-area, for storing information associated with a paper ejecting position;

providing said print control unit with a second memory area for storing information associated with a paper ejecting position;

for ordinary print information, providing an instruction containing said paper ejecting position to said printing portion based on said offset information contained in said print information and the contents stored in said first sub-area, and updating the contents of said common sub-area and said first sub-area based on said paper ejecting position contained in said instruction provided to said printing portion;

for the interruption print information, providing an instruction containing said paper ejecting position to said printing portion based on the offset information contained in said print information and the contents stored in said common sub-area, and updating the contents of said common sub-area and said second sub-area based on said paper ejecting position instructed to said printing position;

updating the contents of said second memory area based on said paper ejecting position in which said paper ejecting mechanism is actually paper-ejected; and updating the contents of said first memory area based on the contents of said second memory area in a recovery operation carried out by said printing apparatus after a printing failure which has occurred in said printing portion.

6. A printing apparatus including a print control unit for outputting print information containing printing information consisting of contents to be printed and offset information showing a paper ejecting position by an offset to the present paper ejecting position; and a printing portion having a printing mechanism for printing on paper based on said printing information and a paper ejecting mechanism for ejecting said paper based on said offset information, said printing apparatus comprising:

a first memory area and a second memory area for storing information associated with a paper ejecting position, being provided with said print control unit;

a paper ejecting position instructing portion for providing an instruction containing a first paper ejecting position to said printing portion based on said offset information and contents stored in said first memory area;

a paper ejecting position update instruction portion for updating the contents of said first memory area based on said first paper ejecting position contained in said instruction provided to said printing portion;

a resultant paper ejecting position update portion for updating the contents of said second memory area based on said paper ejecting position in which said paper ejecting mechanism is actually paper-ejected; and a recovery update portion for updating the contents of said first memory area based on the contents of said second memory area in a recovery operation carried out by said printing apparatus after a printing failure which has occurred in said printing portion.

7. A printing apparatus including a print control unit for outputting print information containing printing information consisting of contents to be printed and offset information showing a paper ejecting position which is offset from the present paper ejecting position; and a printing portion having a printing mechanism for printing on paper based on said printing information and a paper ejecting mechanism for ejecting said paper based on said offset information, said printing apparatus comprising:

a first memory area including a common sub-area, a first sub-area, and a second sub-area, for storing information associated with a paper ejecting position, being provided with said print control unit;

a second memory area for storing information associated with a paper ejecting position, being provided with said print control unit;

an ordinary paper ejecting position update portion for providing an instruction containing said paper ejecting position to said printing portion based on said offset information contained in said print information and the contents stored in said first sub-area, and updating the contents of said common sub-area and said first sub-area based on said paper ejecting position contained in said instruction provided to said printing portion, for ordinary print information;

an interruption paper ejecting position update portion for providing an instruction containing said paper ejecting position to said printing portion based on the offset information contained in said print information and the contents stored in said common sub-area, and updating the contents of said common sub-area and said second sub-area based on said paper ejecting position contained in said instruction provided to said printing portion, for the interruption print information;

a resultant paper ejecting position update portion for updating the contents of said second memory area based on said paper ejecting position in which said paper ejecting mechanism is actually paper-ejected; and a recovery update portion for updating the contents of said first memory area based on the contents of said second memory area in a recovery operation carried out by said printing apparatus after a printing failure which has occurred in said printing portion.

8. A printing apparatus according to claim 7, said second memory area including:

a first sub-area for storing information associated with a paper ejecting position, for ordinary print information, being updated based on said paper ejecting position in which said paper ejecting mechanism is actually paper-ejected;

a second sub-area for storing information associated with a paper ejecting position, for interruption print information, being updated based on said paper ejecting position in which said paper ejecting mechanism is actually paper-ejected; and a common sub-area for being updated based on the paper ejecting position in which said paper ejecting mechanism is actually paper-ejected, for said ordinary print information and said interruption print information.

9. A paper ejecting position control method for a printing apparatus, said printing apparatus including a print control unit for outputting print information containing printing information consisting of contents to be printed and offset information showing a paper ejecting position by an offset to the present paper ejecting position; and a printing portion having a printing mechanism for printing on paper based on said printing information and a paper ejecting mechanism for ejecting said paper based on said offset information, said method comprising the steps of:

providing said print control unit with a first memory area and a second memory area for storing information associated with a paper ejecting position;

providing an instruction containing a first paper ejecting position to said printing portion based on said offset information and contents stored in said first memory area;

updating the contents of said first memory area based on said first paper ejecting position contained in said instruction provided to said printing portion;

updating the contents of said second memory area based on said paper ejecting position in which said paper ejecting mechanism is actually paper-ejected; and updating the contents of said first memory area based on the contents of said second memory area in a recovery operation carried out by said printing apparatus after a printing failure has occurred in said printing portion.

10. A paper ejecting position control method for a printing apparatus according to claim 9, further comprising the steps of:

providing an instruction containing a second paper ejecting position which differs from said first paper ejecting position stored in said first memory area to said printing portion whenever said offset information is present; and providing or not providing an instruction containing said paper ejecting position stored in said first memory area to said printing portion whenever no offset information is present.

11. A paper ejecting position control method for a printing apparatus according to claim 10, further comprising:

providing an instruction containing said first paper ejecting position to said printing portion in coordination only with said offset information contained in a series of said print information whenever other print information interrupting halfway with said series of the print information for carrying out printing over plural sheets of said paper, notwithstanding the presence of the print information which has caused the interruption, in ejecting said paper to be printed based on said series of the print information.

12. A paper ejecting position control method for a printing apparatus according to claim 9, further comprising the step of:

providing an instruction containing said first paper ejecting position to said printing portion in coordination only with said offset information contained in a series of said print information whenever other print information interrupting halfway with said series of the print information for carrying out printing over plural sheets of said paper, notwithstanding the presence of the print information which has caused the interruption, in ejecting said paper to be printed based on said series of the print information.

13. A paper ejecting position control method for a printing apparatus said printing apparatus including a print control unit for outputting print information containing printing information consisting of contents to be printed and offset information showing a paper ejecting position which is offset from the present paper ejecting position; and a printing portion having a printing mechanism for printing on paper based on said printing information and a paper ejecting mechanism for ejecting said paper based on said offset information, said method comprising the steps of:

providing said print control unit with a first memory area including a common sub-area, a first sub-area, and a second sub-area, for storing information associated with a paper ejecting position;

providing said print control unit with a second memory area for storing information associated with a paper ejecting position;

for ordinary print information, providing an instruction containing said paper ejecting position to said printing portion based on said offset information contained in said print information and the contents stored in said first sub-area, and updating the contents of said common sub-area and said first sub-area based on said paper ejecting position contained in said instruction provided to said printing portion;

for the interruption print information, providing an instruction containing said paper ejecting position to said printing portion based on the offset information contained in said print information and the contents stored in said common sub-area, and updating the contents of said common sub-area and said second sub-area based on said paper ejecting position contained in an instruction provided to said printing portion; and updating the contents of said first memory area based on the contents of said second memory area in a recovery operation carried out by said printing apparatus after a printing failure which has occurred in said printing portion.

14. A paper ejecting position control apparatus in a printing apparatus including a print control unit for outputting print information containing printing information consisting of contents to be printed and offset information showing a paper ejecting position by an offset to the present paper ejecting position; and a printing portion having a printing mechanism for printing on paper based on said printing information and a paper ejecting mechanism for ejecting said paper based on said offset information, said control apparatus comprising:

a first memory area and a second memory area for storing information associated with a paper ejecting position, being provided with said print control unit;

a paper ejecting position instruction portion for providing an instruction containing a first paper ejecting position to said printing portion based on said offset information and contents stored in said first memory area;

a paper ejecting position instruction update portion for updating the contents of said first memory area based on said first paper ejecting position contained in said instruction provided to said printing portion;

a resultant paper ejecting position update portion for updating the contents of said second memory area based on said paper ejecting position in which said paper ejecting mechanism is actually paper-ejected; and a recovery update portion for updating the contents of said first memory area based on the contents of said second memory area in a recovery operation carried out by said printing apparatus after a printing failure which has occurred in said printing portion.

15. A paper ejecting position control apparatus in a printing apparatus, said printing apparatus consisting of a print control unit for outputting print information containing printing information including contents to be printed and offset information showing a paper ejecting position by an offset to the present paper ejecting position; and a printing portion having a printing mechanism for printing on paper based on said printing information and a paper ejecting mechanism for ejecting said paper based on said offset information, said control apparatus comprising:

a first memory area including a common sub-area, a first sub-area, and a second sub-area, for storing information associated with a paper ejecting position, being provided with said print control unit;

a second memory area for storing information associated with a paper ejecting position, being provided with said print control unit;

an ordinary paper ejecting position update portion for providing an instruction containing said paper ejecting position to said printing portion based on said offset information contained in said print information and the contents stored in said first sub-area, and updating the contents of said common sub-area and said first sub-area based on said paper ejecting position contained in said instruction provided to said printing portion, for ordinary print information;

an interruption paper ejecting position update portion for providing an instruction containing said paper ejecting position to said printing portion based on the offset information contained in said print information and the contents stored in said common sub-area, and updating the contents of said common sub-area and said second sub-area based on said paper ejecting position contained in an instruction provided to said printing portion, for the interruption print information;

a resultant paper ejecting position update portion for updating the contents of said second memory area based on said paper ejecting position in which said paper ejecting mechanism actually paper-ejected; and a recovery update portion for updating the contents of said first memory area based on the contents of said second memory area in a recovery operation carried out by said printing apparatus after a printing failure which has occurred in said printing portion.

16. A paper ejecting position control apparatus in a printing apparatus according to claim 15, said second memory area including:

a first sub-area for storing information associated with a paper ejecting position, for ordinary print information, being updated based on said paper ejecting position in which said paper ejecting mechanism actually paper-ejected;

a second sub-area for storing information associated with a paper ejecting position, for interruption print information, being updated based on said paper ejecting position in which said paper ejecting mechanism actually paper-ejected; and a common sub-area for being updated based on the paper ejecting position in which said paper ejecting mechanism actually paper-ejected, for said ordinary print information and said interruption print information.

* * * * *